United States Patent [19]

Collins et al.

[11] Patent Number: 4,689,167

[45] Date of Patent: Aug. 25, 1987

[54] DETERGENCY BUILDER SYSTEM

[75] Inventors: Jerome H. Collins, Cincinnati; Larry N. Mackey, Fairfield; Gianfranco L. Spadini, Wyoming, all of Ohio

[73] Assignee: The Procter & Gamble Company, Cincinnati, Ohio

[21] Appl. No.: 823,910

[22] Filed: Jan. 30, 1986

Related U.S. Application Data

[63] Continuation-in-part of Ser. No. 754,561, Jul. 11, 1985, which is a continuation-in-part of Ser. No. 702,521, Feb. 19, 1985, abandoned.

[51] Int. Cl.$^4$ .................. C11D 3/20; C11D 3/395
[52] U.S. Cl. .......................................... 252/95; 252/99; 252/102; 252/525; 252/527; 252/544; 252/546; 252/174.19; 252/174.21; 252/174.23; 252/174.24; 252/DIG. 15
[58] Field of Search ................... 252/95, 99, 102, 525, 252/527, 544, 546, 174.19, 174.21, 174.23, 174.24, DIG. 15

[56] References Cited

U.S. PATENT DOCUMENTS

| | | | |
|---|---|---|---|
| 3,128,287 | 4/1964 | Berg | 260/346.8 |
| 3,308,067 | 3/1967 | Diehl | 252/161 |
| 3,368,978 | 2/1968 | Irani | 252/137 |
| 3,635,830 | 1/1972 | Lamberti et al. | 252/152 |
| 3,776,850 | 12/1973 | Pearson et al. | 252/89.1 |
| 4,379,061 | 4/1983 | Rabitsch et al. | 252/174.24 |
| 4,560,492 | 12/1985 | Curry et al. | 252/110 |
| 4,566,984 | 1/1986 | Bush | 252/140 |
| 4,597,898 | 7/1986 | Vander Meer | 252/529 |

*Primary Examiner*—Robert A. Wax
*Attorney, Agent, or Firm*—David K. Dabbiere; Steven J. Goldstein; Richard C. Witte

[57] ABSTRACT

Disclosed is a highly effective detergency builder system comprising the combination of particular ether carboxylate sequestering agents and particular types of dispersing/anti-redeposition agents. Such selected ether carboxylates can include oxydisuccinate, tartrate monosuccinate and/or tartrate disuccinate. Such particular dispersing/anti-redeposition agents can include salts of acrylic acid-based polymers and co-polymers or can include certian ethoxylated amine materials. This selected combination of particular ether carboxylate sequestering agents and particular dispersing/anti-redeposition agents provide an especially useful builder system for use in phosphorus-free detergent or laundry additive products.

19 Claims, No Drawings

DETERGENCY BUILDER SYSTEM

This application is a continuation-in-part of co-pending U.S. patent application Ser. No. 754,561, filed July 11, 1985, which is in turn a continuation-in-part of abandoned U.S. patent application Ser. No. 702,521, filed Feb. 19, 1985.

TECHNICAL FIELD

The present invention relates to detergency builder systems useful in detergent compositions.

BACKGROUND ART

The term detergency builder can be applied to any component of a detergent composition which increases the detergent power of a surface active agent, hereinafter surfactant. Generally recognized functions of detergency builders include removal of alkaline earth, e.g., calcium, and other undesirable metal ions from washing solutions by sequestration or precipitation, providing alkalinity and buffer capacity, prevention of flocculation, maintenance of ionic strength, protection of anionic surfactants from precipitation, extraction of metals from soils as an aid to their removal, soil suspension, and peptization and dispersion of soil. Polyphosphates such as tripolyphosphates and pyrophosphates are widely used as ingredients in detergent compositions and are highly effective detergency builders. However, the effect of phosphorus on eutrophication of lakes and streams has been questioned and the use of phosphates in detergent compositions has been subject to government regulation or prohibition.

These circumstances have developed a need for highly effective and efficient phosphorus-free detergency builders. Many materials and combinations of materials have been used or proposed as detergency builders. Carbonates and silicates are widely used in granular detergent compositions, but by themselves are deficient as detergency builders in a number of respects. Aluminosilicates such as described in U.S. Pat. No. 4,274,975, issued June 23, 1981, to Corkill et al., have also been used to replace polyphosphates. Aluminosilicates, however, have relatively low calcium and magnesium binding constants and can present solubility problems, particularly in combination with silicates.

Very useful phosphorus-free detergent builder materials have been found to include the ether polycarboxylates. A number of ether carboxylate types have, in fact, been disclosed in the art for use as detergent builders. Many, but not all, ether carboxylates are deficient in calcium binding power relative to inorganic polyphosphates. Some ether carboxylates, however, such as oxydisuccinate as disclosed in Berg; U.S. Pat. No. 3,128,287; issued Apr. 7, 1964 and Lamberti et al; U.S. Pat. No. 3,635,830; issued Jan. 18, 1972, are quite effective in binding hardness ions such as calcium. These selected ether carboxylates can therefore be utilized in detergent builder systems which are as effective as conventional phosphorus-type builders in enhancing cleaning performance of detergent products containing them.

Even though certain ether carboxylate compounds can be as effective in builder performance as phosphate materials, ether carboxylates tend to be relatively expensive materials. Accordingly, it would be desirable to formulate ether carboxylate-containing detergent compositions which provide builder performance that is superior to that of conventional phosphate builders. Such improved builder systems could then be utilized in somewhat lower concentrations in detergent products or could be employed in detergent products which are superior in cleaning performance to conventional phosphate-containing formulations.

In view of the foregoing, it is an object of the present invention to provide ether carboxylate-containing builder compositions which, as a system, provide better builder performance than do conventional phosphate materials such as sodium tripolyphosphate. It is a further object of the present invention to provide improved detergent and laundry additive compositions employing such ether carboxylate-containing builder systems.

SUMMARY OF THE INVENTION

The present invention provides detergent builder compositions which comprise (a) from about 70% to 99% by weight of an ether carboxylate sequestering agent having the general formula:

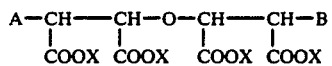

wherein A is H or OH; B is H or

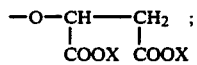

and X is H or a salt-forming cation; and (b) from about 1% to 30% by weight of a particular type of dispersing/anti-redeposition agent. This dispersing/anti-redeposition agent can comprise either a certain type of polycarboxylate material defined in greater detail hereinafter (e.g., polyacrylates or acrylate/maleate copolymers) or can comprise certain types of ethoxylated amine compounds also defined in greater detail hereinafter (e.g., ethoxylated polyethyleneamines and ethoxylated polyethyleneimines). Combinations of such polycarboxylates and ethoxylated amines may also be employed as the dispersing/anti-redeposition agent. The weight ratio of ether carboxylate to dispersing/anti-redeposition agent in such builder compositions ranges from about 99:1 to 70:30.

The present invention also provides detergent and laundry additive compositions containing the two-component, ether carboxylate-based builder systems herein.

DETAILED DESCRIPTION OF THE INVENTION

One essential component of the detergent builder compositions herein is a particular type of ether carboxylate sequestering agent having the general formula hereinbefore set forth. Compounds falling within this general structure bind water-hardness ions such as calcium in aqueous solutions, e.g., a laundry washing solution, by forming polydentate structures therewith.

One type of operable ether carboxylate useful in the present invention is that wherein in the above general formula A and B are both H. Such a material comprises oxydisuccinic acid and its water-soluble salts. Oxydisuccinic acid and salts thereof have the general formula:

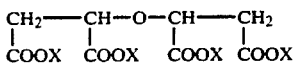

wherein X is H or a salt-forming cation. This material, also known as 3-oxa-1,2,4,5-pentane-tetracarboxylic acid, in either its acid or water-soluble salt form, is hereinafter referred to as "ODS." Preferred salt-forming cations for ODS include alkali metal (sodium, potassium, lithium), ammonium, $C_1$-$C_4$ substituted ammonium and $C_1$-$C_4$ alkanolamine.

ODS is a known material which can be prepared by reacting maleic anhydride, maleic acid and/or derivation thereof in the presence of an alkaline earth metal catalyst. ODS, its preparation and its use as a detergent builder material are described more fully in Berg; U.S. Pat. No. 3,128,287; issued Apr. 7, 1964, and in Lamberti et al; U.S. Pat. No. 3,635,830; issued Jan. 18, 1972. Both of these patents are incorporated herein by reference.

Another type of operable ether carboxylate suitable for use in the builder compositions herein is that wherein in the above general formula A is -OH and B is H. This material comprises tartrate monosuccinic acid and its water-soluble salts. Such compounds have the general formula:

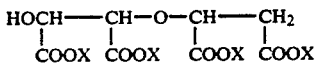

wherein X is H or a salt-forming cation. This material is either its acid or water-soluble salt form is hereinafter referred to as "TMS." Preferred salt-forming cations for TMS include alkali metal (sodium, potassium, lithium) ammonium, $C_1$-$C_4$ substituted ammonium and $C_1$-$C_4$ alkanolamine.

Another type of ether carboxylate which is related to TMS and which is suitable for use in builder compositions herein is the material of the broadly-defined structural formula wherein A is H and B is

Such a material comprises tartrate disuccinic acid and its water-soluble salts. Such compounds have the general formula:

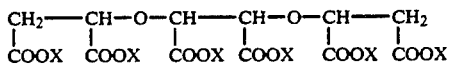

wherein X is H or a salt-forming cation. This material is either its acid or water-soluble salt form is hereinafter referred to as "TDS." Preferred salt-forming cations for TDS are the same as those set forth hereinbefore for TMS.

Both TMS and TDS, can be synthesized by the catalyzed reaction of maleic acid salts with tartaric acid salts. Such a reaction, in fact, produces a mixture of tartrate monosuccinate and tartrate disuccinate with the relative amounts of tartrate monosuccinate and tartrate disuccinate in such a mixture depending on the molar ratio of the maleic and tartaric reactants used and upon the reaction conditions used. Accordingly, such a reaction can be used to form a two-component ether carboxylate mixture which can be used as the essential ether carboxylate component in the compositions of the present invention. The weight ratio of TMS to TDS in such mixtures can range from about 97:3 to 20:80, more preferably from 95:5 to 40:60.

As indicated, the procedure used to prepare the admixture of TMS and TDS involves the calcium catalyzed reation of a maleic acid salt and a tartaric acid salt. Such a process involves the formation of an aqueous reaction mixture containing, as reactants, from about 20% to 60% by weight of both calcium and monovalent salts of maleic acid and tartaric acid. Such a reaction mixture corresponds to the over-neutralized mixture which is formed by combining maleic and tartaric acids in a molar ratio of from about 0.5:1 to about 8:1, along with particular amounts of a source of calcium cations and a neutralizing agent comprising an hydroxide of a monovalent cation. The source of calcium cations, preferably calcium hydroxide, is added to the reaction mixture in a mole ratio of calcium to tartaric acid with the ranges of from about 0.1:1 to 2:1 with the proviso that the moles of calcium added not exceed the total moles of maleic and tartaric acids added. The monovalent neutralizing agent is added in an amount such that the ratio of moles of monovalent cations to (moles of tartaric acid+moles of maleic acid-moles of calcium cations) ranges from about 2.1:1 to about 3.8:1. Such a reaction mixture is maintained at a temperature of from about 20° C. to 120° C. for a period of time sufficient to form a reaction product mixture containing both (a) tartrate monosuccinic acid salt, and (b) tartrate disuccinic acid salt. Such a reaction product mixture is thereafter treated to reduce its calcium content to the extent that the molar ratio of calcium to tartrate succinate compounds therein is less than about 1:10.

TMS, TDS and their admixture, as well as procedures for their preparation, are described in greater detail in the concurrently filed, copending application of Bush, Connor, Heinzman and Mackey having U.S. Ser. No. 823,909. This application is incorporated herein by reference.

The ether carboxylate sequestering agent will generally comprise from about 70% to 99% by weight of the builder compositions. More preferably this ether carboxylate will comprise from about 80% to 95% by weight of the builder compositions. Most preferably, the ether carboxylate component will comprise from about 85% to 92% by weight of the builder compositions herein.

The second essential component of the builder compositions herein comprises one or more selected types of dispersing/anti-redepositon agents. These selected types of dispersing/anti-redeposition agents include (1) certain types of polycarboxylate materials and (2) certain types of ethoxylated amine materials.

The polycarboxylate materials which can be employed as the dispersing/anti redeposition agent component herein are these polymers or copolymers which contain at least about 60% by weight of segments with the general formula

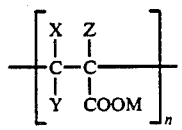

wherein X, Y, and Z are each selected from the group consisting of hydrogen, methyl, carboxy, carboxymethyl, hydroxy and hydroxymethyl; a salt-forming cation and n is from about 30 to about 400. Preferably, X is hydrogen or hydroxy, Y is hydrogen or carboxy, Z is hydrogen and M is hydrogen, alkali metal, ammonia or substituted ammonium.

Polycarboxylate materials of this type can be prepared by polymerizing or copolymerizing suitable unsaturated monomers, preferably in their acid form. Unsaturated monomeric acids that can be polymerized to form suitable polymeric polycarboxylates include acrylic acid, maleic acid (or maleic anhydride), fumaric acid, itaconic acid, aconitic acid, mesaconic acid, citraconic acid and methylenemalonic acid. The presence in the polycarboxylates herein of monomeric segments, containing no carboxylate radicals such as vinylmethyl ether, styrene, ethylene, etc. is suitable provided that such segments do not constitute more than about 40% by weight.

Particularly suitable polycarboxylates can be derived from acrylic acid. Such acrylic acid-based polymers which are useful herein are the water-soluble salts of polymerized acrylic acid. The average molecular weight of such polymers in the acid form ranges from about 4,000 to 10,000, more preferably from about 4000 to 7000 and most preferably from about 4000 to 5000. Water-soluble salts of such acrylic acid polymers can include, for example, the alkali metal, ammonium and substituted ammonium salts. Soluble polymers of this type are known materials. Use of polyacrylates of this type in detergent compositions has been disclosed, for example, in Diehl; U.S. Pat. No. 3,308,067; issued Mar. 7, 1967. This patent is incorporated herein by reference.

Acrylic/maleic-based copolymers may also be used as a preferred component of the dispersing/anti-redeposition agent. Such materials include the water-soluble salts of copolymers of acrylic acid and maleic acid. The average molecular weight of such copolymers in the acid form ranges from about 5,000 to 20,000, preferably from about 6000 to 15000, more preferably from about 7000 to 12000. The ratio of acrylate to maleate segments in such copolymers will generally range from about 30:1 to about 1:1, more preferably from about 10:1 to 2:1. Water-soluble salts of such acrylic acid/maleic acid copolymers can include, for example, the alkali metal, ammonium and substituted ammonium salts. Soluble acrylate/maleate copolymers of this type are known materials which are described in European Patent Application No. 66915, published Dec. 15, 1982, which publication is incorporated herein by reference.

Certain ethoxylated amine compounds may also be used as the dispersing/anti-redeposition component of the builder compositions herein. Such compounds are selected from the group consisting of:

(1) ethoxylated monoamines having the formula:

$$(X-L-)-N-(R^2)_2$$

(2) ethoxylated diamines having the formula:

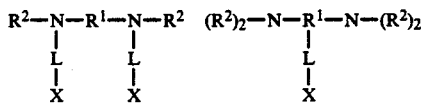

or

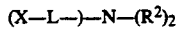

(3) ethoxylated polyamines having the formula:

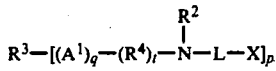

(4) ethoxylated amine polymers having the general formula:

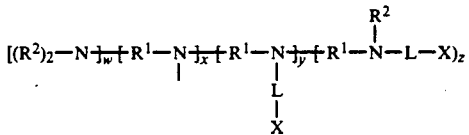

and (5) mixtures thereof; wherein $A^1$ is

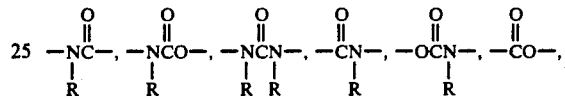

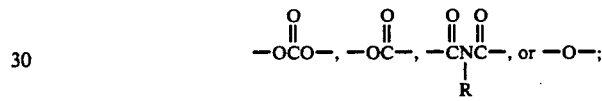

R is H or $C_1$-$C_4$ alkyl or hydroxyalkyl; $R^1$ is $C_2$-$C_{12}$ alkylene, hydroxyalkylene, alkenylene, arylene or alkarylene, or a $C_2$-$C_3$ oxyalkylene moiety having from 2 to about 20 oxyalkylene units provided that no O—N bonds are formed; each $R^2$ is $C_1$-$C_4$ alkyl or hydroxyalkyl, the moiety —L—X, or two $R^2$ together form the moiety —$(CH_2)_r$—$A^2$—$(CH_2)_s$—, wherein $A^2$ is —O— or —$CH_2$—, r is 1 or 2, s is 1 or 2, and r+s is 3 or 4; X is a nonionic group, an anionic group or mixture thereof; $R^3$ is a substituted $C_3$-$C_{12}$ alkyl, hydroxyalkyl, alkenyl, aryl, or alkaryl group having p substitution sites; $R^4$ is $C_1$-$C_{12}$ alkylene, hydroxyalkylene, alkenylene, arylene or alkarylene, or a $C_2$-$C_3$ oxyalkylene moiety have from 2 to about 20 oxyalkylene units provided that no O—O or O—N bonds are formed; L is a hydrophilic chain which contains the polyoxyalkylene moiety —[($R^5$O)$_m$($CH_2CH_2O$)$_n$]—, wherein $R^5$ is $C_3$-$C_4$ alkylene or hydroxyalkylene and m and n are numbers such that the moiety —($CH_2CH_2O$)$_n$— comprises at least about 50% by weight of said polyoxyalkylene moiety; for said monoamines, m is from 0 to about 4, and n is at least about 12; for said diamines, m is from 0 to about 3, and n is at least about 6 when $R^1$ is $C_2$-$C_3$ alkylene, hydroxyalkylene, or alkenylene, and at least about 3 when $R^1$ is other than $C_2$-$C_3$ alkylene, hydroxyalkylene or alkenylene; for said polyamines and amine polymers, m is from 0 to about 10 and n is at least about 3; p is from 3 to 8; q is 1 or 0; t is 1 or 0, provided that t is 1 when q is 1; w is 1 or 0; x+y+z is at least 2; and y+z is at least 2.

As indicated, in the preceding formulas, $R^1$ can be branched (e.g. 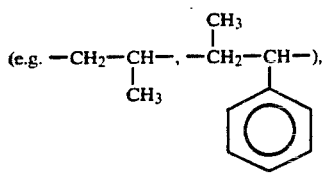

cyclic (e.g. 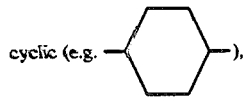), or most preferably linear (e.g. —CH$_2$CH$_2$—, —CH$_2$—CH$_2$—CH$_2$—,

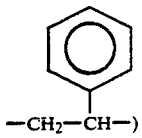

alkylene, hydrozyalkylene, alkenylene, alkarylene or oxyalkylene. R$^1$ is preferably C$_2$-C$_6$ alkylene for the ethoxylated diamines and amine polymers. For the ethoxylated diamines, the minimum degree of ethoxylation required for suitable clay soil removal/anti-redeposition properties decreases on going from C$_2$-C$_3$ alkylene (ethylene, propylene) to hexamethylene. However, for the ethoxylated amine polymers, in particular the ethoxylated polyalkyleneamines and polyalkyleneimines, especially at higher molecular weights, C$_2$-C$_3$ alkylenes (ethylene, propylene) are preferred for R$^1$ with ethylene being most preferred. Each R$^2$ is preferably the moiety —L—X.

In the preceding formulas, hydrophilic chain L usually consists entirely of the polyoxyalkylene moiety —[(R$^5$O)$_m$(CH$_2$CH$_2$O)$_n$]—. The moieties —(R$^5$O)$_m$— and —(CH$_2$CH$_2$O)$_n$— of the polyoxyalkylene moiety can be mixed together or preferably form blocks of —(R$^5$O)$_m$— and —(CH$_2$CH$_2$O)$_n$— moieties. R$^5$ is preferably C$_3$H$_6$ (propylene). For the ethoxylated polyamines and amine polymers, m is preferably from 0 to about 5. For all ethoxylated amines used in the present invention, m is most preferably 0, i.e. the polyoxyalkylene moiety consists entirely of the moiety —(CH$_2$CH$_2$O)$_n$—. The moiety —(CH$_2$CH$_2$O)$_n$— preferably comprises at least about 85% by weight of the polyoxyalkylene moiety and most preferably 100% by weight (m is 0).

In the preceding formulas, X can be any compatible nonionic group, anionic group or mixture thereof. Suitable nonionic groups include C$_1$-C$_4$ alkyl or hydroxyalkyl ester or ether groups, preferably acetate or methyl ether, respectively; hydrogen (H); or mixtures thereof. The particularly preferred nonionic group is H. With regard to anionic groups, PO$_3$$^{-2}$ and SO$_3$$^-$ are suitable. The particularly preferred anionic group is SO$_3$$^-$. It has been found that the percentage of anionic groups relative to nonionic groups can be important to the anti-redeposition properties provided by the ethoxylated amine. A mixture of from 0 to about 30% anionic groups and from about 70 to 100% nonionic groups provides preferred properties. A mixture of from about 5 to about 10% anionic groups and from about 90 to about 95% nonionic groups provides the most preferred properties. Usually, a mixture of from 0 to about 80%  anionic groups and from about 20 to 100% nonionic groups provides suitable anti-redeposition properties.

Preferred ethoxylated mono- and diamines have the formula:

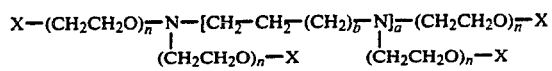

wherein X and n are defined as before, a is 0 or 1, and b is from 0 to 4. For preferred ethoxylated monoamines (a=o), n is at least about 15, with a typical range of from about 15 to about 35. For preferred ethoxylated diamines (a=1), n is at least about 12 with a typical range of from about 12 to about 42.

In the preceding formula for the ethoxylated polyamines, R$^3$ (linear, branched or cyclic) is preferably a substituted C$_3$-C$_6$ alkyl, hydroxyalkyl or aryl group; A$^1$ is preferably

n is preferably at least about 12, with a typical range of from about 12 to about 42; p is preferably from 3 to 6. When R$^3$ is a substituted aryl or alkaryl group, q is preferably 1 and R$^4$ is preferably C$_2$-C$_3$ alkylene. When R$^3$ is an alkyl, hydroxyalkyl, or alkenyl group, and when q is 0, R$^1$ is preferably a C$_2$-C$_3$ oxyalkylene moiety; when Q is 1, R$^4$ is preferably C$_2$-C$_3$ alkylene.

These ethoxylated polyamines can be derived from polyamino amides such as:

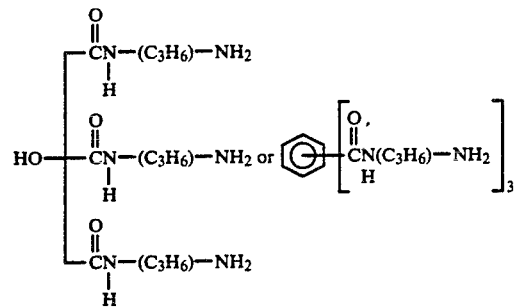

These ethoxylated polyamines can also be derived from polyaminopropyleneoxide derivatives such as:

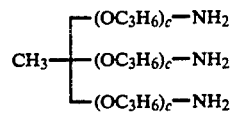

wherein each c is a number of from 2 to about 20.

Preferred ethoxylated amine polymers are the ethoxylated C$_2$-C$_3$ polyalkyleneamines and polyalkyleneimines. Particularly preferred ethoxylated polyalkyleneamines and polyalkyleneimines are the ethoxylated polyethyleneamines (PEAs) and polyethyleneimines (PEIs). These preferred compounds comprise units having the general formula:

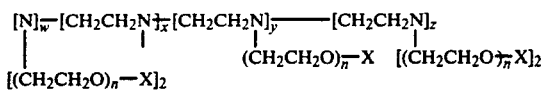

wherein X, w, x, y, z and n are defined as before.

Prior to ethoxylation, the PEAs used in preparing compounds of the present invention have the following general formula:

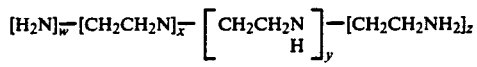

wherein $x+y+z$ is from 2 to 9, $y+z$ is from 2 to 9 and w is 0 or 1 (molecular weight of from about 100 to about 400). Each hydrogen atom attached to each nitrogen atom represents an active site for subsequent ethoxylation. For preferred PEAs, $y+z$ is from about 3 to about 7 (molecular weight of from about 140 to about 310) and most preferably from about 3 to about 4 (molecular weight of from about 140 to about 200). These PEAs can be obtained by reactions involving ammonia and ethylene dichloride, followed by fractional distillation. The common PEAs obtained are triethylenetetramine (TETA) and tetraethylenepentamine (TEPA). Above the pentamines, i.e., the hexamines, heptamines, octamines and possibly nonamines, the cogenerically derived mixture does not appear to separate by distillaion and can include other materials such as cyclic amines and particularly piperazines. There can also be present cyclic amines with side chains in which nitrogen atoms appear. See U.S. Pat. No. 2,792,372 to Dickson, issued May 14, 1957, which describes the preparation of PEAs.

The minimum degree of ethoxylation required for preferred clay soil removal/anti-redeposition performance can vary depending upon the number of units in the PEA. Where $y+z$ is 2 or 3, n is preferably at least about 6. Where $y+z$ is from 4 to 9, suitable benefits are achieved when n is at least about 3. For most preferred ethoxylated PEAs, n is at least about 12 with a typical range of from about 12 to about 42.

The PEIs used in preparing the dispersing/anti-redeposition agents used in the present invention have a molecular weight of at least about 440 prior to ethoxylation, which represents at least about 10 units. Preferred PEIs used in preparing these compounds have a molecular weight of from about 600 to about 1800. The polymer backbone of these PEIs can be represented by the general formula:

wherein the sum of x, y and z represents a number of sufficient magnitude to yield a polymer having the molecular weights previously specified. Although linear polymer backbones are possible, branch chains can also occur. The relative proportions of primary, secondary and tertiary amine groups present in the polymer can vary, depending on the manner of preparation. The distribution of amine groups is typically as follows:

| | |
|---|---|
| $-CH_2CH_2-NH_2$ | 30% |
| $-CH_2CH_2-NH-$ | 40% |
| $-CH_2CH_2-N-$ | 30% |

Each hydrogen atom attached to each nitrogen atom of the PEI represents an active site for subsequent ethoxylation. These PEIs can be prepared, for example, by polymerizing ethyleneimine in the presence of a catalyst such as carbon dioxide, sodium bisulfite, sulfuric acid, hydrogen peroxide, hydrochloric acid, acetic acid, etc. Specific methods for preparing PEIs are disclosed in U.S. Pat. No. 2,182,306 to Ulrich et al., issued Dec. 5, 1939; U.S. Pat. No. 3,033,746 to Mayle et al., issued May 8, 1962; U.S. Pat. No. 2,208,095 to Esselmann et al., issued July 16, 1940; U.S. Pat. No. 2,806,839 to Crowther, issued Sept. 17, 1957; and U.S. Pat. No. 2,553,696 to Wilson, issued May 21, 1951 (all herein incorporated by reference).

As defined in the preceding formulas, n is at least about 3 for the ethoxylated PEIs. However, it should be noted that the minimum degree of ethoxylation required for suitable clay soil removal/anti-redeposition performance can increase as the molecular weight of the PEI increases, especially much beyond about 1800. Also, the degree of ethoxylation for preferred compounds increases as the molecular weight of the PEI increases. For PEIs having a molecular weight of at least about 600, n is preferably at least about 12, with a typical range of from about 12 to about 42. For PEIs having a molecular weight of at least 1800, n is preferably at least about 24, with a typical range of from about 24 to about 42.

The ethoxylated amine compounds useful in dispersing/anti-redeposition agents in the builder compositions of the present invention can be prepared by standard methods for ethoxylating amines. For the diamines, polyamines, and amine polymers such as the polyalkyleneamines and polyalkyleneimines, there is preferably an initial step of condensing sufficient ethylene oxide to provide 2-hydroxyethyl groups at each reactive site (hydroxyethylation). This initial step can be omitted by starting with a 2-hydroxyethyl amine such as triethanolamine (TEA). The appropriate amount of ethylene oxide is then condensed with these 2-hydroxyethylamines using an alkali metal (e.g., sodium, potassium) hydride or hydroxide as the catalyst to provide the respective ethoxylated amines. The total degree of ethoxylation per reactive site (n) can be determined according to the following formula:

Degree of Ethoxylation $= E/(A \times R)$ wherein E is the total number of moles of ethylene oxide condensed (including hydroxyethylation), A is the number of moles of the starting amine, and R is the number of reactive sites (typically 3 for monoamines, 4 for diamines, $2 \times p$ for polyamines, and $3+y+z$ for the amine polymers) for the starting amine.

Preferred embodiments of the builder compositions herein utilize a combination of polycarboxylates and ethoxylated amines as the dispersing/anti-redeposition agent components. In such embodiments, the weight ratio of polycarboxylate to ethoxylated amine generally ranges from about 5:1 to 1:5, more preferably from about 3:2 to 2:3. Compositions containing such a combination of polycarboxylate and ethoxylated amine dispersing/anti-redeposition agents are especially effective at promoting certain types of fabric cleaning.

Whether a single material or a combination of compounds, the dispersing/anti-redeposition component will generally comprise from about 1% to 30% by weight of the builder composition, more preferably from about 5% to 20% by weight, most preferably from about 8% to 15% by weight. Furthermore, it is preferred that within the builder compositions herein, the weight ratio of ether carboxylate to dispersing/anti-redeposition agent ranges from about 70:30 to 99:1, more preferably from about 80:20 to 95:5.

The builder compositions herein can be prepared by simply combining the essential ether carboxylate sequestering agent and the polycarboxylate and/or ethoxylated amine dispersing/anti-redeposition agent in the desired proportions. This combination of components can be prepared as a builder composition per se. More frequently however, the essential components of the builder compositions herein will simply be incorporated individually into a detergent composition or laundry additive composition. In such detergent or laundry additive compositions, the weight ratio of the essential ether carboxylate component to the essential dispersing-/anti-redeposition component will generally range from about 70:30 to 99:1, more preferably from about 80:20 to 95.5.

Detergent compositions incorporating the builder systems of the present invention contain as essential components from about 5% to about 40% of a surfactant, from about 5% to about 50% of the ether carboxylate sequestering agent and from about 0.2% to 5% by weight of the dispersing/anti-redeposition agent.

Typical laundry detergent compositions within the scope of the present invention contain from about 5% to about 30% of a surfactant and from about 5% to about 80% total detergency builder. Of this builder component from about 20% to 100% by weight of builder component can be the two-compound builder systems of the present invention with the balance of the builder component being optional known builders.

Detergent compositions herein may also contain from about 0.1% to 95% by weight of a wide variety of additional optional components. Such optional components can include, for example, additional detergent builders, chelating agents, enzymes, fabric whiteners and brighteners, sudsing control agents, solvents, hydrotropes, bleaching agents, bleach precursors, buffering agents, additional soil removal/anti-redeposition agents, soil release agents, fabric softening agents, perfumes, colorants and opacifiers. A number of these additional optional components are hereinafter described in greater detail.

The detergent compositions of this invention are effective in cleaning solutions over the broad cleaning solution pH range of from about 6 to about 13. The compositions can be formulated to provide a desired cleaning solution pH by proper selection of the acid form of appropriate salts or mixtures thereof. Preferred water-soluble salts of the builder compounds, for example, can be the alkali metal salts such as sodium, potassium, lithium and ammonium or substituted ammonium, e.g. triethanol ammonium. Depending on the pH of the desired solution, the salts are partially or fully neutralized.

The detergent compositions of this invention can be prepared in solid or liquid physical form.

The detergent compositions of this invention are particularly suitable for laundry use, but are also suitable for the cleaning of hard surfaces and for dishwashing.

In a laundry method using the detergent composition of this invention, typical laundry wash water solutions comprise from about 0.1% to about 1% by weight of the detergent compositions of this invention.

The two-component builder systems herein may also be employed as builders in laundry additive compositions. Laundry additive compositions of the present invention contain as essential components from about 5% to about 95% of the ether carboxylate compounds hereinbefore described and from about 0.2% to 10% by weight of the dispersing/anti-redeposition agents hereinbefore described. Such laundry additives compositions will also contain from about 0.5% to 98% by weight of a laundry adjuvant selected from the group consisting of surfactants, alternate builders, enzymes, fabric whiteners and brighteners, sudsing control agents, solvents, hydrotropes, bleaching agents, bleach precursors, buffering agents, additional soil removal/antideposition agents, soil release agents, fabric softening agents, perfumes, colorants, opacifiers and mixtures of these adjuvants. Such adjuvants, whether used in the detergent or laundry additive compositions herein, perform their expected functions in such compositions. A number of these adjuvants are described in greater detail as follows:

Surfactants

Various types of surfactants can be used in the detergent or laundry additive compositions of this invention. Useful surfactants include anionic, nonionic, ampholytic, zwitterionic and cationic surfactants or mixtures of such materials. Detergent compositions for laundry use typically contain from about 5% to about 30% anionic surfactants, mixtures of anionic and nonionic surfactants or cationic surfactants. Detergent compositions for use in automatic dishwashing machines typically contain from about 2% to about 6% by weight of a relatively low sudsing nonionic surfactant or mixtures thereof and, optionally, suds control agents. Particularly suitable low sudsing nonionic surfactants are the alkoxylation products of compounds containing at least one reactive hydrogen wherein, preferably, at least about 20% by weight of the alkylene oxide by weight is propylene oxide. Examples are products of the BASF-Wyandotte Corporation designated Pluronic ®, Tetronic ®, Pluradot ® and block polymeric variations in which propoxylation follows ethoxylation. Preferred suds control agents include mono-and distearyl acid phosphates.

The various classes of surfactants useful in the detergent and laundry additive compositions herein are exemplified as follows:

(A) Anionic soap and non-soap surfactants

This class of surfactants includes alkali metal monocarboxylates (soaps) such as the sodium, potassium, ammonium and alkylolammonium salts of higher fatty acids containing from about 8 to about 24 carbon atoms and preferably from about 12 to about 18 carbon atoms. Suitable fatty acids can be obtained from natural sources such as, for instance, from plant or animal esters (e.g., palm oil, coconut oil, babassu oil, soybean oil, castor oil, tallow, whale and fish oils, grease, lard, and mixtures thereof). The fatty acids also can be synthetically prepared (e.g., by the oxidation of petroleum, or by hydrogenation of carbon monoxide by the Fischer-Tropsch process). Resin acids are suitable such as rosin and those resin acids in tall oil. Naphthenic acids are also suitable. Sodium and potassium soaps can be made by direct saponification of the fats and oils or by the neutralization of the free fatty acids which are prepared in a separate manufacturing process. Particularly useful are the sodium and potassium salts of the mixtures of fatty acids derived from coconut oil and tallow, i.e., sodium or potassium tallow and coconut soap. Soaps and fatty acids also act as detergency builders in detergent compositions because they remove multivalent ions by precipitation.

Anionic surfactants also include water-soluble salts, particularly the alkali metal and ethanolamine salts of organic sulfuric reaction products having in their molecular structure an alkyl radical containing from about 8 to about 22 carbon atoms and a sulfonic acid or sulfuric acid ester radical. (Included in the term alkyl is the alkyl portion of alkylaryl radicals.) Examples of this group of non-soap anionic surfactants are the alkyl sulfates, especially those obtained by sulfating the higher alcohols ($C_8$–$C_{18}$ carbon atoms); alkyl benzene sulfonates, in which the alkyl group contains from about 9 to about 15 carbon atoms, in straight chain or branched chain configuration, sodium alkyl glyceryl ether sulfonates; fatty acid monoglyceride sulfonates and sulfates; sulfuric acid esters of the reaction product of one mole of a $C_{12-18}$ alcohol and about 1 to 6 moles of ethylene oxide and salts of alkyl phenol ethylene oxide ether sulfate with about 1 to about 10 units of ethylene oxide per molecule and in which the alkyl radicals contain about 8 to about 12 carbon atoms.

Additional examples of non-soap anionic surfactants are the reaction products of fatty acids esterified with isethionic acid and neutralized with sodium hydroxide where, for example, the fatty acids are derived from coconut oil and sodium or potassium salts of fatty acid amide of methyl lauride in which the fatty acids, for example are derived from coconut oil.

Still other anionic surfactants include the class designated as succinamates. This class includes such surface active agents as disodium N-octadecylsulfosuccinamate; tetrasodium N-(1,2-dicarboxyethyl)-N-octadecylsulfosuccinamate; the diamyl ester of sodium sulfosuccinic acid; the dihexyl ester of sodium sulfosuccinic acid and the dioctyl ester of sodim sulfosuccinic acid.

Anionic phosphate surfactants are also useful in the detergent or laundry additive compositions of the present invention. These are surface active materials having substantial detergent capability in which the anionic solubilizing group connecting hydrophobic moieties is an oxy acid of phosphorus. The more common solubilizing groups are —$SO_4H$, —$SO_3H$, and —$CO_2H$. Alkyl phosphate esters such as $(R—O)_2PO_2H$ and $ROPO_3H_2$ in which R represents an alkyl chain containing from about 8 to about 20 carbon atoms are useful.

These esters can be modified by including in the molecule from one to about 40 alkylene oxide units, e.g., ethylene oxide units.

Particularly useful anionic surfactants for incorporation into the compositions herein are alkyl ether sulfates. The alkyl ether sulfates are condensation products of ethylene oxide and monohydric alcohols having about 10 to about 20 carbon atoms. Preferably, R has 12 to 18 carbon atoms. The alcohols can be derived from fats, e.g., coconut oil or tallow, or can be synthetic. Such alcohols are reacted with 0.5 to 30, and especially 1 to 6, molar proportions of ethylene oxide and the resulting mixture of molecular species, having, for example, an average of 3 to 6 moles of ethylene oxide per mole of alcohol, is sulfated and neutralized.

Other suitable anionic surfactants are olefin and paraffin sulfonates having from about 12 to about 24 carbon atoms.

(B) Nonionic surfactants

Alkoxylated nonionic surfactants may be broadly defined as compounds produced by the condensation of alkylene oxide groups (hydrophilic in nature) with an organic hydrophobic compound, which may be aliphatic or alkyl aromatic in nature. The length of the hydrophilic or polyoxyalkylene radical which is condensed with any particular hydrophobic group can be readily adjusted to yield a water-soluble compound having the desired degree of balance between hydrophilic and hydrophobic elements.

Alkoxylated nonionic surfactants include:

(1) The condensation product of aliphatic alcohols having from 8 to 22 carbon atoms, in either straight chain or branched chain configuration, with from about 5 to about 20 moles of ethylene oxide per mole of alcohol.

(2) The polyethylene oxide condensates of alkyl phenols, e.g., the condensation products of alkyl phenols having an alkyl group containing from about 6 to 12 carbon atoms in either a straight chain or branched chain configuration, with ethylene oxide, the ethylene oxide being present in amounts of from about 5 to about 25 moles of ethylene oxide per mole of alkyl phenol. The alkyl substituent in such compounds may be derived from polymerized propylene, diisobutylene, octene, or nonene, for example.

(3) Materials derived from the condensation of ethylene oxide with a product resulting from the reaction of propylene oxide and a compound with reactive hydrogen such as glycols and amines such as, for example, compounds containing from about 40% to about 80% polyoxyethylene by weight resulting from the reaction of ethylene oxide with a hydrophobic base constituted of the reaction product of ethylene diamine and propylene oxide.

Non-polar nonionic surfactants include the amine oxides and corresponding phosphine oxides. Useful amine oxide surfactants include those having the formula $R^1R^2R^3N\rightarrow O$ wherein $R^1$ is an alkyl group containing from about 10 to about 28 carbon atoms, from 0 to about 2 hydroxy groups and from 0 to about 5 ether linkages, there being at least one moiety of $R^1$ which is an alkyl group containing from about 10 to about 18 carbon atoms and $R^2$ and $R^3$ are selected from the group consisting of alkyl radicals and hydroxyalkyl radicals containing from 1 to about 3 carbon atoms.

Specific examples of amine oxide surfactants include: dimethyldodecylamine oxide, dimethyltetradecylamine oxide, ethylmethyltetradecylamine oxide, cetyldimethylamine oxide, diethyltetradecylamine oxide, dipropyldodecylamine oxide, bis-(2-hydroxyethyl)-dodecylamine oxide, bis-(2-hydroxypropyl)methyltetradecylamine oxide, dimethyl-(2-hydroxydodecyl)amine oxide, and the corresponding decyl, hexadecyl and octadecyl homologs of the above compounds.

Additional operable nonionic surfactants include alkyl glucosides and alkylamides of the formula

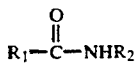

wherein $R_1$ is $C_{10}$–$C_{18}$ alkyl and $R_2$ is —H, —CH$_2$ or —C$_2$H$_5$.

(C) Zwitterionic Surfactants

Zwitterionic surfactants include derivatives of aliphatic quaternary ammonium, phosphonium, and sulfonium compounds in which the aliphatic moiety can be straight or branched chain and wherein one of the aliphatic substituents contains from about 8 to 24 carbon atoms and one contains an anionic water-solubilizing group. Particularly preferred zwitterionic materials are the ethoxylated ammonium sulfonates and sulfates disclosed in U.S. Pat. Nos. 3,925,262, Laughlin et al, issued Dec. 9, 1975 and 3,929,678, Laughlin et al, issued Dec. 30, 1975, said patents being incorporated herein by reference. Ammonioamidates are also useful zwitterionic surfactants.

(D) Ampholytic Surfactants

Ampholytic surfactants include derivatives of aliphatic-heterocyclic secondary and tertiary amines in which the aliphatic moiety can be straight chain or branched and wherein one of the aliphatic substituents contains from about 8 to about 24 carbon atoms and at least one aliphatic substituent contains an anionic water-solubilizing group.

(E) Cationic Surfactants

Cationic surfactants comprise a wide variety of compounds characterized by one or more organic hydrophobic groups in the cation and generally by a quaternary nitrogen associated with an acid radical. Pentavalent nitrogen ring compounds are also considered quaternary nitrogen compounds. Suitable anions are halides, methyl sulfate and hydroxide. Tertiary amines can have characteristics similar to cationic surfactants at washing solutions pH values less than about 8.5.

A more complete disclosure of cationic surfactants can be found in U.S. Pat. No. 4,228,044, issued Oct. 14, 1980, to Cambre, incorporated herein by reference.

When cationic surfactants are used in combination with anionic surfactants and certain detergency builders including polycarboxylates, campatibility must be considered. A type of cationic surfactant generally compatible with anionic surfactants and polycarboxylates is a $C_{8-18}$ alkyl tri $C_{1-3}$ alkyl ammonium chloride or methyl sulfate.

More complete disclosures of surfactants suitable for incorporation in detergent and laundry additive compositions of the present invention are in U.S. Pat. Nos. 4,056,481, Tate (Nov. 1, 1977); 4,049,586, Collier (Sept. 20, 1977); 4,040,988, Vincent et al (Aug. 9, 1977); 4,035,257, Cherney (July 12, 1977); 4,033,718, Holcolm et al (July 5, 1977); 4,019,999, Ohren et al (Apr. 26, 1977); 4,019,988, Vincent et al (Apr. 26, 1977); and 3,985,669, Krummel et al (Oct. 12, 1976); all of said patents being incorporated herein by reference.

Optional Detergency Builders

The detergent and laundry additive compositions of the present invention can contain detergency builders in addition to the particular ether carboxylate compounds or mixtures described hereinbefore as essential components.

Suitable additional polycarboxylate detergency builders include the acid form and alkali metal, ammonium and substituted ammonium salts of citric, ascorbic, phytic, mellitic, benzene pentacarboxylic, oxydiacetic, carboxymethyloxysuccinic, carboxymethyloxymalonic, cis-cyclohexanehexacarboxylic, and cis-cyclopentanetetracarboxylic acids.

The polyacetyl carboxylates disclosed in U.S. Pat. No. 4,144,226 issued Mar. 13, 1979, to Crutchfield et al and U.S. Pat. No. 4,146,495 issued Mar. 27, 1979 to Crutchfield et al can be incorporated in the detergent and laundry additive compositions of the invention.

Also suitable in the detergent and laundry additive compositions of the invention are the 3,3-dicarboxy-4-oxa-1,6-hexanedioates and the related compounds disclosed in U.S. Ser. No. 672,302 filed Nov. 16, 1984, and incorporated herein by reference.

Suitable ether polycarboxylates also include cyclic compounds, particularly alicyclic compounds, such as described in U.S. Pat. Nos. 3,923,679; 3,835,163; 4,158,635; 4,120,874 and 4,102,903, incorporated herein by reference.

Polyphosphonate detergency builders comprise a large range of organic compounds having two or more

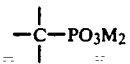

groups, wherein M is hydrogen or a salt-forming radical. Suitable phosphonates inclue ethane-1-hydroxy-1,1-diphosphonates, ethanehydroxy-1,1,2-triphosphonates and their oligomeric ester chain condensates. Suitable polyphosphonates for used in the compositions of the invention also include nitrogen-containing polyphosphonates such as ethylenediaminetetrakis (methylenephosphonic) acid and diethylenetriaminepentakis (methylenephosphonic) acid and alkali metal, ammonium and substituted ammonium salts thereof. In common with other phosphorus-containing components, the incorporation of phosphonates may be restricted or prohibited by government regulation.

As discussed hereinbefore $C_{8-24}$ alkyl monocarboxylic acid and soluble salts thereof have a detergent builder function in addition to surfactant characteristics. $C_8$–$C_{24}$ alkyl, alkenyl, alkoxy and thio-substituted alkyl dicarboxylic acid compounds, such as 4-pentadecene-1,2-dicarboxylic acid, salts thereof and mixtures thereof, are also useful optional detergency builders.

Inorganic detergency builders useful in the detergent and laundry additive compositions of this invention at total combined levels of from 0% to about 75% by weight, include alkali metal phosphates, sodium aluminosilicates, alkali metal silicates and alkali metal carbonates.

Phosphate detergency builders include alkali metal orthophosphates which remove multivalent metal cations from laundry solutions by precipitation and the polyphosphates such as pyrophosphates, tripolyphosphates and water-soluble metaphosphates that sequester multivalent metal cations in the form of soluble complex salts or insoluble precipitating complexes. Sodium pyrophosphate and sodium tripolyphosphate are particularly suitable in granular detergent and laundry additive compositions to the extent that governmental regulations do not restrict or prohibit the use of phosphorus-containing compounds in such compositions. Granular detergent and laundry additive composition embodiments of the invention particularly adapted for used in areas where the incorporation of phosphorus-containing compounds is restricted contains low total phosphorus and, preferably, essentially no phosphorus.

Other optional builder material include aluminosilicate ion exchange materials, e.g. zeolites. Crystalline aluminosilicate ion exchange materials useful in the practice of this invention have the formula $Na_z[(AlO_2)_z(SiO_2)_y]H_2O$ wherein z and y are at least about 6, the molar ratio of z to y is from about 1.0 to about 0.5 and x if from about 10 to about 264. In a preferred embodiment the aluminosilicate ion exchange material has the formula $Na_{12}[(AlO_1)_{12}(SiO_2)_{12}]xH_2O$ wherein x is from about 20 to about 30, especially about 27.

Amorphous hydrated aluminosilicate material useful herein has the empirical formula: $Na_z(zAlO_2 \cdot ySiO_2)$, z is from about 0.5 to about 2, y is 1 and said material has a magnesium ion exchange capacity of at least about 50 milligram equivalents of $CaCO_3$ hardness per gram of anhydrous aluminosilicate.

The aluminosilicate ion exchange builder materials herein are in hydrated form and contain from about 10% to about 28% of water by weight if crystalline and potentially even higher amounts of water if amorphous. Highly preferred crystalline aluminosilicate ion exchange materials contain from about 18% to about 22% water in their crystal matrix. The crystalline aluminosilicate ion exchange materials are further characterized by a particle size diameter of from about 0.1 micron to about 10 microns. Amorphous materials are often smaller, e.g., down to less than about 0.01 micron. Preferred ion exchange materials have a particle size. diameter of from about 0.2 micron to about 4 microns. The term "particle size diameter" herein represents the average particle size diameter of a given ion exchange material as determined by conventional analytical techniques such as, for example, microscopic determination utilizing a scanning electron microscope. The crystalline aluminosilicate ion exchange materials herein are usually further characterized by their calcium ion exchange capacity, which is at least about 200 mg. equivalent of $CaCO_3$ water hardness/gm. of aluminosilicate, calculated on an anhydrous basis, and which generally is in the range of from about 300 mg.eq./g. to about 352 mg. eq./g. The aluminosilicate ion exchange materials herein are still further characterized by their calcium ion exchange rate which is at least about 2 grains $Ca++$/gallon/minute/gram of aluminosilicate (anhydrous basis), and generally lies within the range of from about 2 grains/gallon/minute/gram to about 6 grains/gallon/minute/gram, based on calcium ion hardness. Optimum aluminosilicate for builder purposes exhibit a calcium ion exchange rate of at least about 4 grains/gallon/minute/gram.

The amorphous aluminosilicate ion exchange materials usually have a $Mg++$ exchange capacity of at least about 50 mg. eq. $CaCO_3$/g(12 mg. $Mg++$/g.) and a $Mg++$ exchange rate of at least about 1 gr./gal.-/min./g./gal. Amorphous materials do not exhibit an observable diffraction pattern when examined by Cu radiation (1.54 Angstrom Units).

Aluminosilicate ion exchange materials useful as optional builders in the detergent and laundry additive compositions of this invention are commercially available. The aluminosilicates useful in this invention can be crystalline or amorphous in structure and can be naturally-occurring aluminosilicates or synthetically derived. A method for producing aluminosilicate ion exchange materials is discussed in U.S. Pat. No. 3,985,669, issued Oct. 12, 1976, incorporated herein by reference. Preferred synthetic crystalline aluminosilicate ion exchange materials useful herein are available under the designation Zeolite A, Zeolite B, and Zeolite X.

Other optional builders include alkali metal silicates. Suitable alkali metal silicates have a mole ratio of $SiO_2$:alkali metal oxide in the range of from about 1:1 to about 4:1. The alkali metal silicate suitable herein include commercial preparations of the combination of silicon dioxide and alkali metal oxide or carbonate fused together in varying proportions according to, for example, the following reaction:

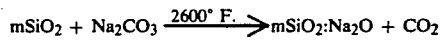

$$mSiO_2 + Na_2CO_3 \xrightarrow{2600° F.} mSiO_2:Na_2O + CO_2$$

The value of m, designating the molar ratio of $SiO_2$:$Na_2O$, ranges from about 0.5 to about 4 depending on the proposed use of the sodium silicate. The term "alkali metal silicate" as used herein refers to silicate solids with any ratio of $SiO_2$ to alkali metal oxide. Silicate solids normally possess a high alkalinity content; in addition water of hydration is frequently present as, for example, in metasilicates which can exist having 5, 6, or 9 molecules of water. Sodium silicate solids with a $SiO_2$:$Na_2O$ mole ratio of from about 1.5 to about 3.5, are preferred in granular laundry detergent compositions.

Silicate solids are frequently added to granular detergent or laundry additive compositions as corrosion inhibitors to provide protection to the metal parts of the washing machine in which the detergent or laundry additive composition is utilized. Silicates have also been used to provide a degree of crispness and pourability to detergent or laundry additive granules which is very desirable to avoid lumping and caking.

Alkali metal carbonates are useful in the granular detergent or laundry additive compositions of the invention as a source of washing solution alkalinity and because of the ability of the carbonate ion to remove calcium and magnesium ions from washing solutions by precipitation.

Preferred granular compositions free of inorganic phosphates contain from about 8% to about 40% by weight sodium carbonate, from 0% to about 30% sodium aluminosilicate, from about 0.5% to about 10% sodium silicate solids, from about 5% to about 35% of the particular ether carboxylate compounds of this invention, from about 0.2% to 5% by weight of the particular dispersing/anti-redeposition agents of this invention, and from about 10% to about 25% surfactant.

Preferred liquid compositions free of inorganic phosphates contain from about 8% to about 30% by weight of non-soap anionic surfactants, from about 2% to about 25% ethoxylated nonionic surfactants, from about 5% to about 20% of a $C_{8-24}$ alkyl or alkenyl mono- or dicarboxylic acid or salt thereof, from about 2% to about 18% of the particular ether carboxylate compounds of the present invention and from about 0.2% to 5% by weight of the dispersing/anti-redeposition agents of the present invention. Some liquid formulations may also contain from about 0.5 to about 5% of a cationic or amine oxide surfactant.

Additional Optional Components

Granular detergent or laundry additive compositions of this invention can contain materials such as sulfates, borates, perborates organic peroxy acid salts, peroxy bleach precursors and activators and water of hydration.

Liquid detergent or laundry additive compositions of this invention can contain water and other solvents. Low molecular weight primary or secondary alcohol exemplified by methanol, ethanol, propanol, and isopropanol are suitable. Monohydric alcohols are preferred for solubilizing the surfactant but polyols containing from 2 to about 6 carbon atoms and from 2 to about 6 hydroxy groups can be used and can provide improved enzyme stability. Examples of polyols include propylene glycol, ethylene glycol, glycerine and 1,2-propanediol. Ethanol is a particularly preferred alcohol.

The detergent or laundry additive compositions of the invention can also contain such materials as proteolytic and amylolytic enzymes, fabric whiteners and optical brighteners, sudsing control agents, hydrotropes such as sodium toluene, xylene or cumene sulfonate, perfumes, colorants, opacifiers, and alkalinity control or buffering agents such as monoethanolamine and triethanolamine. The use of these materials is known in the detergent art.

Soil release agents, such as disclosed in the art to reduce oily staining of polyester fabrics, are also useful in the detergent and laundry additive compositions of the present invention. U.S. Pat. No. 3,962,152 issued June 8, 1976, to Nicol et al., incorporated herein by reference, discloses copolymers of ethylene terephthalate and polyethylene oxide terephthalate as soil release agents. U.S. Pat. No. 4,174,305 issued Nov. 13, 1979, to Burns et al., incorporated herein by reference, discloses cellulose ether soil release agents. U.S. Ser. No. 684,511, filed Dec. 21, 1984, by Gosselink, incorporated herein by reference, discloses block polyester compounds useful as soil release agents in detergent and laundry additive compositions.

The detergent and laundry additive compositions herein may also optionally contain one or more iron and magnesium chelating agents. Such chelating agents can be selected from the group consisting of amino carboxylates, amino phosphonates, polyfunctionally-substituted aromatic chelating agents and mixtures thereof, all as hereinafter defined. Without relying on theory, it is speculated that the benefit of these materials is due in part to their exceptional ability to remove iron and manganese ions from washing solutions by formation of soluble chelates.

Amino carboxylates useful as optional chelating agents in compositions of the invention have one or more, preferably at least two, units of the substructure

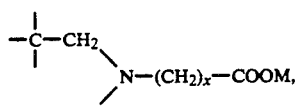

wherein M is hydrogen, alkali metal, ammonium or substituted ammonium (e.g. ethanolamine) and x is from 1 to about 3, preferably 1. Preferably, these amino carboxylates do not contain alkyl or alkenyl groups with more than about 6 carbon atoms. Alkylene groups can be shared by substructures. Operable amine carboxylates include ethylenediaminetetraacetates, N-hydroxyethylethylenediaminetriacetates, nitrilotriacetates, ethylenediamine tetrapropionates, diethylenetriaminepentaacetates, and ethanoldiglycines.

Amino phosphonates are also suitable for use as chelating agents in the compositions of the invention when at least low levels of total phosphorus are permitted in detergent compositions. Compounds with one or more, preferably at least two, units of the substructure

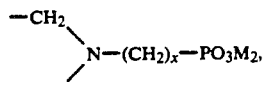

wherein M is hydrogen, alkali metal, ammonium or substituted ammonium and x is from 1 to about 3, preferably 1, are useful and include ethylenediaminetetrakis(methylenephosphonates), nitrilotris(methylenephosphonates) and diethylenetriaminepentakis(methylenephosphonates). Preferably, these amino phosphonates do not contain alkyl or alkenyl groups with more than about 6 carbon atoms. Alkylene groups can be shared by substructures.

Polyfunctionally-substituted aromatic chelating agents are also useful in the compositions herein. These materials comprise compounds having the general formula

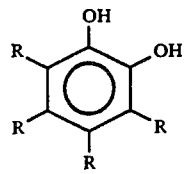

wherein at least one R is —SO$_3$H or —COOH or soluble salts thereof and mixtures thereof. U.S. Pat. No. 3,812,044 issued May 21, 1974, to Connor et al, incorporated herein by reference, discloses polyfunctionally-substituted aromatic chelating and sequestering agents. Preferred compounds of this type in acid form are dihydroxydisulfobenzenes and 1,2-dihydroxy-3,5-disulfobenzene or other disulfonated catechols in particular. Alkaline detergent compositions can contain these materials in the form of alkali metal, ammonium or substituted ammonium (e.g. mono- or triethanolamine) salts.

If utilized, optional chelating agents will generally comprise from about 0.1% to 10% by weight of the detergent or laundry additive compositions herein. More preferably chelating agents will comprise from about 0.75% to 3% by weight of such compositions.

The detergent and laundry additive compositions of this invention can also include a bleach system comprising an inorganic or organic peroxy bleaching agent and, in preferred compositions, an organic peroxy acid bleach precursor. Suitable inorganic peroxygen bleaches include sodium perborate mono- and tetrahydrate, sodium percarbonate, sodium persilicate and urea-hydrogen peroxide addition products and the clathrate 4Na$_2$SO$_4$:2H$_2$O$_2$:1NaCl. Suitable organic bleaches include peroxylauric acid, peroxyoctanoic acid, peroxynonanoic acid, peroxydecanoic acid, diperoxydodecanedioic acid, diperoxyazelaic acid, mono- and diperoxyphthalic acid and mono- and diperoxyisophthalic acid. The bleaching agent is generally present in the detergent and laundry additive compositions of this invention at a level of from about 5% to about 50% preferably from about 10% to about 25% by weight.

The detergent and laundry additive compositions of the invention may also contain an organic peroxy acid bleach precursor at a level of from about 0.5% to about 10%, preferably from about 1% to about 6% by weight. Suitable bleach precursors are disclosed in UK-A-2040983, and include for example, the peracetic acid bleach precursors such as tetraacetylethylenediamine, tetraacetylmethylenediamine, tetraacetylhexylenediamine, sodium p-acetoxybenzene sulfonate, tetraacetylglycouril, pentaacetlyglucose, octaacetyllactose, and methyl o-acetoxy benzoate. Highly preferred bleach precursors, however, have the general formula

wherein R is an alkyl group containing from 6 to 12 carbon atoms wherein the longest linear alkyl chain extending from and including the carboxyl carbon contains from 5 to 10 carbon atoms and L is a leaving group, the conjugate acid of which has a logarithmic acidity constant in the range from 6 to 13.

The alkyl group, R, can be either linear or branched and, in preferred embodiments, it contains from 7 to 9 carbon atoms. Preferred leaving groups L have a logarithmic acidity constant in the range from about 7 to about 11, more preferably from about 8 to about 10. Examples of leaving groups are those having the formula

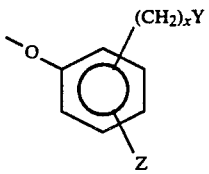 (a)

and

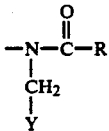 (b)

wherein Z is H, $R^1$ or halogen, $R^1$ is an alkyl group having from 1 to 4 carbon atoms, X is O or an integer of from 1 to 4 and Y is selected from $SO_3M$, $OSO_3M$, $CO_2M$, $N^+(R^1)_3O^-$ and $N^+(R^1)_2$—$O^-$ wherein M is H, alkali metal, alkaline earth metal, ammonium or substituted ammonium, and O is halide or methosulfate.

The preferred leaving group L has the formula (a) in which Z is H, x is 0 and Y is sulfonate, carboxylate or dimethylamine oxide radical. Highly preferred materials are sodium 3,5,5-trimethylhexanoyloxybenzene sulfonate, sodium 3,5,5-trimethylhexanoyloxybenzoate, sodium 2-ethylhexanoyl oxybenzenesulfonate, sodium nonanoyl oxybenzene sulfonate and sodium octanoyl oxybenzenesulfonate, the acyloxy group in each instance preferably being p-substituted.

The bleach precursor (activator) herein will normally be added in the form of particles comprising finely-divided bleach activator and a binder. The binder is generally selected from nonionic surfactants such as the ethoxylated tallow alcohols, polyethylene glycols, anionic surfactants, film forming polymers, fatty acids and mixtures thereof. Highly preferred are nonionic surfactant binders, the bleach activator being admixed with the binder and extruded in the form of elongated particles through a radial extruder as described in European Patent Application No. 62523. Alternatively, the bleach activator particles can be prepared by spray drying.

The following embodiments illustrate, but are not limiting of, the builder compositions of the present invention, as well as detergent compositions containing the builder systems herein. All percentages herein are by weight unless indicated otherwise.

EXAMPLE I

In this Example a builder composition is formulated by preparing a mixture of ether carboxylates and by adding thereto an ethoxylated polyamine dispersing/anti-redeposition agent.

A. Ether Carboxylate Mixture Preparation

A mixture of tartrate monosuccinate (TMS) and tartrate disuccinate (TDS) is prepared by a procedure which involves the reaction of maleate salts and tartrate salts. In such a procedure, maleic anhydride (2205 g, 22.5 moles) is heated in 2000 g of distilled water until dissolved. The resultant solution of maleic acid is cooled to 85±5° C. and 2250 g L-(+)-tartaric acid (15.0 moles) is added with stirring at 85±5° C. until a homogeneous clear acid solution is obtained.

Separately, 1111 g of calcium hydroxide (15.0 moles) is slowly added to a mixture of 4440 g of 50% sodium hydroxide solution (55.5 moles) and 1000 g distilled water while stirring at a moderate rate such that only a small fraction of unwetted calcium hydroxide is upon the surface of the solution at a time. Stirring is continued until an essentially uniform base mixture is obtained.

The base mixture is then added at a uniform rate over 0.5 hour to the moderately stirred acid solution which is at 70°-85° C. The resulting reaction mixture is cooled with warm (ca. 60° C.) water in order to maintain a reaction temperature of 90±5° C. most of the time. The reaction mixture may, however, boil briefly from time to time. The object is to prevent major losses of water vapor and also to limit the amount of insoluble salt which crystallizes upon the cool reaction vessel walls. As the last 10% of base is added, the reaction temperature is held at 85° C. The reaction mixture is quickly weighted and brought to 13,020 g, i.e., 50% active, with 200 g of distilled water. (Active is defined here as total weight of organics taken as their sodium salts i.e., sodium maleate and sodium tartrate or 160×22.5 moles+194×15.0 moles=6510 g.)

The reaction mixture is immediately heated with steam, stirred moderately in a covered reactor, and a 0.40 g sample taken with time arbitrarily set at zero. The reaction mixture which is a white suspension, is brought to 98°-100° C. within 10 minutes. Within 15 to 20 minutes to time zero, the reaction mixture clears. Samples (0.40±0.04 g) of the reaction solution are taken every half hour to be dissolved in 100 ml 0.1N sulfuric acid solution and immediately submitted for high pressure liquid chromatography (HPLC) analysis in order to monitor the course of the reaction.

The results of HPLC analysis of the 1.5 hour sample indicate that the reaction is to be quenched at the 2.0 hour point. Quenching consists of cooling the reaction product mixture of 50° C. within 10 minutes. The homogeneous, almost colorless quenched reaction product solution is reweighed and is made up again to 13,020 g with 327 g of distilled water to give a reaction product solution containing 50% active.

HPLC analysis indicates that the composition of the reaction product solution is 11.1% tartrate, 1.7% malate, 12.6% maleate, 10.9% fumarate, 35.0% peak 2A, 19.6% peak 2B, 3.3% peak 3A, and 5.9% peak 3B. Peaks 2A and 2B are isomers of sodium tartrate monosuccinate (TMS) and peaks 3A and 3B are isomers of sodium tartrate disuccinate (TDS). Therefore, the HPLC estimated yield of TMS+TDS based upon all peak areas is 63.7%. The approximate weight ratio of TMS:TDS is 86:14. All yields are based upon HPLC refractive index raw data, i.e., are not corrected to mole %. Calculated yield of this reaction based on tartrate is 4,139 g.

A second reaction product batch of the same size is made using similar procedures. HPLC analysis indicates that the composition of this second reaction product solution is 9.8% tartrate, 1.7% malate, 12.4% maleate, 10.1% fumarate, 35.0% peak 2A, 18.1% peak 2B, 5.1% peak 3A, and 7.9% peak 3B. Again peaks 2A and 2B are isomers of sodium tartrate monosuccinate (TMS) and peaks 3A and 3B are isomers of sodium tartrate disuccinate (TDS). Therefore, the HPLC-estimated yield of TMS+TDS based upon all peak areas is 66.1%. The approximate weight ratio of TMS:TDS is 80:20. Yield is 4400 g based on calculations.

Both reaction product batches are combined to give 26,040 g of solution which is calculated to contain 8539 g of TMS/TDS and 30 moles of calcium ion. This solution is then diluted with 26,040 g of water. While this solution is at 26° C. and stirred vigorously, a 28% solution of 7500 g (30 mole) of ethanehydroxydiphosphonate disodium salt dissolved in 18,750 g of water is added followed by 3178 g of 50% sodium hydroxide solution to give a pH of 10.5. Stirring is continued for 18 hours; the final pH is eleven. The resulting precipitate (EHDP-calcium complex) is then removed by filtration using suction filtration equipment with a paper filter, and the filtrate is washed with 4 liters of water. The resulting supernatant, 56 liters, is filtered again through a glass frit to remove any remaining fine particles. This clear solution is then evaporated in a steam heated vat with a compressed air stream blown above the surface to give a solution of 32,550 g.

This solution is then poured into 80 liters of vigorously stirred methanol. This is done to help separate the less soluble TMS and TDS from the more soluble maleic and fumaric acid salts. The stirring is continued for 15 minutes followed by a ½ hour settling period. Then the liquid is decanted from the gummy solid by siphon. This solid is dissolved in 13,500 g of distilled water to give 26,685 g of solution which is then poured into 68 liters of methanol, essentially repeating the above. The resulting solid is dissolved in 6 liters of distilled water (pH=8.4), and the vat is heated with steam. Methanol is removed with a stream of nitrogen directed on the surface of the solution which is well stirred. This is continued until 'H-NMR analysis indicates that the methanol is removed. The resulting solution is 16,380 g. To reduce viscosity, 2 liters of water are added, and the mixture is filtered to give 18,887 g of solution. This solution is analyzed and found to have the following composition by high pressure liquid chromatography using a refractive index detector: 43.6% TMS/TDS (8,235 g or 96.4% recovery by workup), 2.1% tartrate, 0.5% malate, 0.9% maleate, and 1.1% fumarate. The TMS/TDS ratio is 78.2:21.8. The calcium ion level of the solution is 0.048 weight % as determined by atomic absorption.

B. Ethoxylated Polyamine Preparation

Tetraethylenepentamine (TEPA) (M.W. 189, 61.44 g., 0.325 moles) is placed in a nominally dry flask and dried by stirring for 0.5 hours at 110°–120° C. under a vacuum (pressure less than 1 mm.) The vacuum is released by drawing ethylene oxide (EO) from a prepurged trap connected to a supply tank. Once the flask is filled with EO, an outlet stopcock is carefully opened to a trap connected to an exhaust bubbler. After 3 hours stirring at 107°–115° C., 99.56 g. of EO is added to give a calculated degree of ethoxylation of 0.995. The reaction mixture is cooled while being swept with argon and 2.289 g. (0.057 moles) of 60% sodium hydride in mineral oil are then added. The stirred reaction mixture is swept with argon until hydrogen evolution ceased. EO is then added to the reaction mixture under atmospheric pressure at 109°–118° C. with moderately fast stirring. After 23 hours, a total of 1503 g. (34.17 moles) of EO has been added to give a calculated total degree of ethoxylation of 15.02. The ethoxylated TEPA obtained is a tan waxy solid.

C. Builder Composition Preparation 94 grams of the TMS/TDS mixture prepared in Part A are admixed with 6 grams of the ethoxylated TEPA material as prepared in Part B. Such a composition is especially suitable for use as a builder system in surfactant-containing detergent compositions or in a laundry additive composition.

EXAMPLE II

A granular detergent composition for household laundry use is as follows:

| Component | Wt. % |
|---|---|
| Sodium $C_{14}$-$C_{15}$ alkylsulfate | 13.3 |
| Sodium $C_{13}$ linear alkyl benzene sulfonate | 5.7 |
| $C_{12}$-$C_{13}$ alkylpolyethoxylate (6.5) | 1.0 |
| Sodium toluene sulfonate | 1.0 |
| TMS/TDS, sodium salt, 86/14 weight ratio (TMS:TDS of the Example I type) | 25.0 |
| Sodium N—hydroxyethylethylenediaminetriacetate | 2.0 |
| Sodium polyacrylate (Avg. M.W. approx. 5000) | 2.0 |
| Sodium carbonate | 20.3 |
| Sodium silicate | 5.8 |
| Polyethylene glycol (Avg. M.W. approx. 8000) | 1.0 |
| Sodium sulfate, water and miscellaneous | Balance to ~100% |

The components are added together with continuous mixing with sufficient extra water (about 40% total) to form an aqueous slurry which is then spray dried to form the composition.

EXAMPLE III

A liquid detergent composition for household laundry use is as follows:

| Component | Wt. % |
|---|---|
| Potassium $C_{14}$-$C_{15}$ alkyl polyethoxy (2.5) sulfate | 8.3 |
| $C_{12}$-$C_{14}$ alkyl dimethyl amine oxide | 3.3 |
| Potassium toluene sulfonate | 5.0 |
| Monoethanolamine | 2.3 |
| TMS/TDS triethanolamine salt, 85/15 TMS/TDS | 15.0 |

| Component | Wt. % |
|---|---|
| Potassium salt of 1,2-dihydroxy-3,5-disulfobenzene | 1.5 |
| Ethoxylated tetraethylenepentamine (Example I-type) | 1.5 |
| Potassium polyacrylate (avg. M.W. approx. 9000) | 1.5 |
| Water and miscellaneous | Balance to 100% |

The components are added together with continuous mixing to form the composition.

EXAMPLE IV

A liquid detergent composition for household laundry use is prepared by mixing the following ingredients:

| | |
|---|---|
| $C_{13}$ alkylbenzenesulfonic acid | 10.5% |
| Triethanolamine cocoalkyl sulfate | 4.0 |
| $C_{14-15}$ alcohol ethoxy-7 | 12.0 |
| $C_{12-18}$ alkyl monocarboxylic acids | 15.0 |
| TMS/TDS, triethanolamine salt 85/15 TMS/TDS | 5.0 |
| Diethylenetriaminepentakis (methylenephosphonic) acid | 0.8 |
| Polyacrylic acid (avg. M.W. approx. 5000) | 0.8 |
| Triethanolamine | 4.5 |
| Ethanol | 8.6 |
| 1,2-Propanediol | 3.0 |
| Water, perfume, buffers and miscellaneous | Balance to 100% |

EXAMPLE V

In the Compositions which follow, the abbreviations used have the following designations:

| | |
|---|---|
| $C_{12}LAS$ | Sodium linear $C_{12}$ benzene sulfonate |
| TAS | Sodium tallow alcohol sulfonate |
| $TAE_n$ | Hardened tallow alcohol ethoxylated with n moles of ethylene oxide per mole of alcohol |
| Dobanol 45$_E$7 | A $C_{14-15}$ primary alcohol condensed with 7 moles of ethylene oxide |
| TAED | Tetraacetyl ethylene diamine |
| NOBS | Sodium nonanoyl oxybenzenesulfonate |
| INOBS | Sodium 3,5,5 trimethyl hexanoyl oxybenzene sulfonate |
| Silicate | Sodium silicate having an $SiO_2:Na_2O$ ratio of 1:6 |
| Sulfate | Anhydrous sodium sulfate |
| Carbonate | Anhydrous sodium carbonate |
| CMC | Sodium carboxymethyl cellulose |
| Silicone | Comprising 0.14 parts by weight of an 85:15 by weight mixture of silanated silica and silicone, granulated with 1.3 parts of sodium tripolyphosphate, and 0.56 parts of tallow alcohol condensed with 25 molar proportions of ethylene oxide |
| PC1 | Copolymer of 3:7 maleic/acrylic acid, average molecular weight about 70,000, as sodium salt |
| PC2 | Polyacrylic acid, average molecular weight about 4,500, as sodium salt |
| ODS | Sodium oxydisuccinate |
| Perborate | Sodium perborate tetrahydrate of nominal formula $NaBO_2.3H_2O.H_2O_2$ |
| Enzyme | Protease |
| EDTA | Sodium ethylene diamine tetra acetate |
| Brightener | Disodium 4,4'-bis(2-morpholino-4-anilino-s-triazin-6-ylamino) stilbene-2:2'-disulfonate |
| DETPMP | Diethylene triamine penta(methylene phosphonic acid), marketed by Monsanto under the Trade name Dequest 2060 |
| EDTMP | Ethylenediamine tetra (methylene phosphonic acid), marketed by Monsanto, under the Trade name Dequest 2041 |

Granular detergent compositions are prepared as follows. A base powder composition is first prepared by mixing all components except, where present, Dobanol 45E7, bleach, bleach activator, enzyme, suds suppresser, phosphate and carbonate in crutcher as an aqueous slurry at a temperature of about 55° C. and containing about 35% water. The slurry is then spray dried at a gas inlet temperature of about 330° C. to form base powder granules. The bleach activator, where present, is then admixed with $TAE_{25}$ as binder and extruded in the form of elongated particles through a radical extruder as described in European Patent Application Number 62523. The bleach activator noodles, bleach, enzyme, suds suppressor, phosphate and carbonate are then dry-mixed with the base powder composition and finally Dobanol 45E7 is sprayed into the final mixture.

| | COMPOSITIONS | | | |
|---|---|---|---|---|
| | A | B | C | D |
| $C_{12}LAS$ | 4 | 9 | 8 | 8 |
| TAS | 4 | 3 | — | 3 |
| $TAE_{25}$ | 0.5 | 0.5 | 0.8 | — |
| $TAE_{11}$ | — | 1 | — | — |
| Dobanol 45E7 | 4 | — | 4 | 2 |
| NOBS | — | 2 | — | — |
| INOBS | 3 | — | — | — |
| TAED | 0.5 | — | 3 | — |
| Perborate | 19 | 20 | 10 | 24 |
| EDTMP | 0.3 | — | 0.4 | 0.1 |
| DETPMP | — | 0.4 | — | — |
| EDTA | 0.2 | 0.2 | 0.2 | 0.1 |
| Magnesium (ppm) | 1000 | 1000 | 750 | — |
| PC1 | 2 | 1 | 2 | 2 |
| PC2 | 1 | 1 | — | 1 |
| ODS | 25 | 7 | 15 | 10 |
| Zeolite A* | — | 15 | 14 | — |
| Sodium tripolyphosphate | — | — | — | 12 |
| Coconut Soap | — | — | — | 2 |
| Carbonate | 17 | 15 | 10 | — |
| Silicate | 3 | 2 | 2 | 7 |
| Silicone | 0.2 | 0.2 | 0.3 | 0.2 |
| Enzyme | 0.8 | 0.5 | 0.4 | 0.3 |
| Brightener | 0.2 | 0.2 | 0.2 | 0.2 |
| Sulfate, Moisture & Miscellaneous | to 100 | | | |

*Zeolite A of 4 Å pore size.

The above compositions are zero and low phosphate detergent compositions displaying excellent bleach stability, fabric care and detergency performance across the range of wash temperatures with particularly outstanding performance in the case of Compositions A, B and C on greasy and particulate soils at low wash temperatures.

EXAMPLE VI

Aqueous washing solutions corresponding to solutions containing 1500 ppm of various granular detergent compositions are tested for their ability to remove several types of soils from several types of fabrics. The granular detergent composition of these types are those which contain the following components in the following amount:

| Component | Wt. % |
| --- | --- |
| Sodium C$_{13}$ linear alkylbenzenesulfonate | 7.4 |
| Sodium C$_{14}$-C$_{15}$ alkylsulfate | 7.4 |
| C$_{12}$-C$_{13}$ alkylpolyethoxylate (2.5) | 1.5 |
| Sodium Silicate | 4.7 |
| Sodium Carbonate | 17.3 |
| Builder | 31.5 |
| Dispersing/Anti-redeposition Agent | 2 |
| Sodium Diethylene Triamine Penta Acetate (DTPA) Chelating Agent (Optional) | 1 |
| Sodium Sulfate, Water and Minors | Balance to 100% |

Artifically soiled 5"×5" fabrics representing a range of typical consumer stains are washed in a mini-washer using two gallons of aqueous washing solution as hereinbefore described. Each such treatment employs a different combination of builder, dispersing/anti-redeposition agent and/or chelating agent as set forth in the following table:

| Treatment No. | Builder | Dispersing/Anti-Redeposition Agent | Chelant |
| --- | --- | --- | --- |
| 1 | TMS/TDS[A] | None | None |
| 2 | TMS/TDS | 50/50 Mixture of PC2[B] and PEA$_{189}$E$_{15}$[C] | None |
| 3 | TMS/TDS | 50/50 Mixture of PC2 and PEA$_{189}$E$_{15}$ | DTPA[D] |
| 4 | TMS/TDS | None | DTPA |
| 5 | STPP[E] | None | None |

[A]Mixture of tartrate monosuccinate and tartrate disuccinate in a TMS to TDS weight ratio of 80/20, sodium salt form
[B]Polyacrylic acid, average molecular weight about 4500, as sodium salt
[C]Ethoxylated tetraethylenepentamine having a molecular weight prior to ethoxylation of about 189 and a degree of ethoxylation of about 15
[D]Sodium diethylenetriaminepentaacetate
[E]Sodium tripolyphosphate Test fabrics are washed with these treatment solutions in wash water of 98° F. and rinsed in water at 70° F. Water hardness is 12 grains/gallon. Clean white cotton terry cloths are added as ballast fabrics to realize a test fabric weight of 300 grams per treatment. All fabrics are subseqently dried in mini-dryers.

Three replicates of each such treatment are conducted. A balanced complete block paired comparison test design provides for the fabrics reprsenting each stain type for a given treatment to be viewed relative to the other treatments. Stain removal is graded by expert graders. Each grader provides numerical cleaning difference grades on a nine point scale (−4 through +4) for each comparison.

Treatment means are calculated and are listed in the table hereinafter after normalization of the means based on a zero value for treatment number one (TMS/TDS alone).

| Soils | Panel Score Units Treatment No. | | | | | |
| --- | --- | --- | --- | --- | --- | --- |
| | 1 | 2 | 3 | 4 | 5 | LSD[A] |
| Clay on Cotton | 0.0 | 1.7* | 1.6* | −0.1 | 1.4 | 1.52 |
| Clay on Poly-cotton | 0.0 | 2.6* | 2.6* | 0.2 | 1.4* | 1.03 |
| Grass on Poly-cotton | 0.0 | 0.7 | 0.6 | 0.1 | 0.5 | 1.36 |
| Tea on Poly-cotton | 0.0 | 0.6 | 1.0* | 0.8 | 0.9* | 0.92 |
| Spaghetti Sauce on Poly-cotton | 0.0 | 0.4 | 0.3 | −0.4 | −1.4* | 1.03 |
| Bacon Grease on Cotton | 0.0 | −0.2 | −0.0 | 0.2 | −1.1* | 0.48 |
| Animal Blood on Cotton | 0.0 | 1.2* | 1.5* | 0.6* | 1.0* | 0.55 |
| Poly-cotton Anti-redeposition Swatch | 0.0 | 3.9* | 4.3* | 0.2 | 1.9* | 0.81 |
| Cotton Anti-redeposition Swatch | 0.0 | 1.2 | 1.2 | 0.3 | −0.8 | 1.38 |
| Facial Soil on Poly-cotton | 0.0 | 0.7* | 0.7* | 0.1 | −0.3 | 0.49 |

[A]Least significant difference at 95% confidence level
*Indicates value is significantly different than Treatment 1, a plus value indicating improved stain removal.

What is claimed is:

1. A detergent builder composition especially useful in phosphorus-free detergent or laundry additive products, said composition comprising:

(A) from about 70% to 99% by weight of one or more of an ether carboxylate sequestering agent having the formula:

$$\begin{array}{c} A-CH-CH-O-CH-CH-B \\ | \quad | \quad \quad | \quad | \\ COOX \; COOX \quad COOX \; COOX \end{array}$$

wherein
A is H or OH;
B is H or

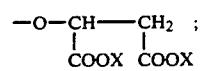

and
X is H or a salt-forming cation; and (B) from about 1% to 30% by weight of a dispersing-/anti-redeposition agent selected from the group consisting of:

(i) polycarboxylates which are polymers or copolymers which contain at least about 60% by weight of segments having the general formula:

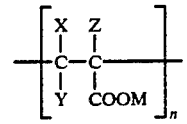

wherein X, Y and Z are, independently, selected from hydrogen, methyl, carboxy, carboxymethyl, hydroxy and hydroxymethyl; M is H or a salt-forming cation and n ranges from about 30 to about 400; and (ii) combinations of said polycarboxylates with ethoxylated amine material selected from the group consisting of (a) ethoxylated monoamines having the formula:

$$(X-L-)-N-(R^2)_2$$

(b) ethoxylated diamines having the formula:

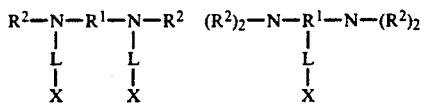

or

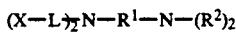

(c) ethoxylated polyamines having the formula:

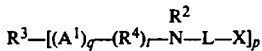

(d) ethoxylated amine polymers having the general formula:

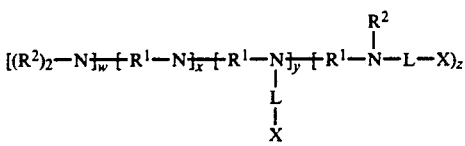

and
(e) mixtures of such ethoxylated amines;
wherein, $A^1$ is

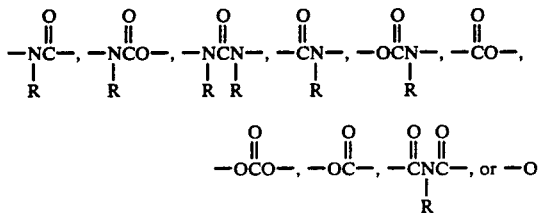

R is H or $C_1$-$C_4$ alkyl or hydroxyalkyl; $R^1$ is $C_2$-$C_{12}$ alkylene, hydroxyalkylene, alkenylene, arylene or alkarylene, or a $C_2$-$C_3$ oxyalkylene moiety having from 2 to about 20 oxyalkylene units provided that no O—N bonds are formed; each $R^2$ is $C_1$-$C_4$ alkyl or hydroxyalkyl, the moiety —L—X, or two $R^2$ together form the moiety —(CH$_2$)$_r$—A$^2$—(CH$_2$)$_s$—, wherein $A^2$ is —O— or —CH$_2$—, r is 1 or 2, s is 1 or 2, and r+s is 3 or 4; X is a nonionic group, an anionic group or mixture thereof; $R^3$ is a substituted $C_3$-$C_{12}$ alkyl, hydroxyalkyl, alkenyl, aryl, or alkaryl group having p substitution sites; $R^4$ is $C_1$-$C_{12}$ alkylene, hydroxyalkylene, alkenylene, arylene or alkarylene, or a $C_2$-$C_3$ oxyalkylene moiety have from 2 to about 20 oxyalkylene units provided that no O—O or O—N bonds are formed; L is a hydrophilic chain which contains the polyoxyalkylene moiety —[($R^5$O)$_m$(CH$_2$CH$_2$O)$_n$]—, wherein $R^5$ is $C_3$-$C_4$ alkylene or hydroxyalkylene and m and n are numbers such that the moiety —(CH$_2$CH$_2$O)$_n$— comprises at least about 50% by weight of said polyoxyalkylene moiety; for said monoamines, m is from 0 to about 4, and n is at least about 12; for said diamines, m is from 0 to about 3, and n is at least about 6 when $R^1$ is $C_2$-$C_3$ alkylene, hydroxyalkylene, or alkenylene, and at least about 3 when $R^1$ is other than $C_2$-$C_3$ alkylene, hydroxyalkylene or alkenylene; for said polyamines and amine polymers, m is from 0 to about 10 and n is at least about 3; p is from 3 to 8; q is 1 or 0; t is 1 or 0, provided that t is 1 when q is 1; w is 1 or 0; x+y+z is at least 2; and y+z is at least 2;

the weight ratio of sequestering agent to dispersing/anti-redeposition agent within said composition being within the range of from about 70:30 to 99:1.

2. A builder composition according to claim 1 wherein
   (A) the ether carboxylate sequestering agent comprises from about 80% to 95% by weight of the composition;
   (B) the dispersing/anti-redeposition agent comprises from about 5% to 20% by weight of the composition; and
   (C) the weight ratio of sequestering agent to dispersing/anti-redeposition agent in the composition ranges from about 80:20 to 95:5.

3. A builder composition according to claim 2 wherein
   (A) the ether carboxylate sequestering agent is a watersoluble salt of oxydisuccinic acid; and
   (B) the dispersing/anti-redeposition agent is selected from
      (i) water-soluble salts of polyacrylic acid;
      (ii) ethoxylated amine polymers; and
      (iii) combinations of said polyacrylic acid salts and said ethoxylated amine polymers in a weight ratio of polyacrylic acid salt to ethoxylated amine polymerof from about 5:1 to 1:5.

4. A builder composition according to claim 2 wherein
   (A) the ether carboxylate sequestering agent is selected from
      (i) tartrate monosuccinic acid, or salt thereof, of the structure

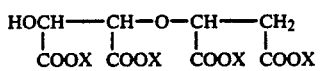

wherein X is H or a salt-forming cation;
      (ii) tartrate disuccinic acid, or salt thereof, of the structure:

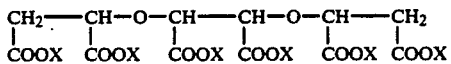

wherein X is H or a salt-forming cation, or
      (iii) a combination of said tartrate monosuccinic acid or salt and said tartrate disuccinic acid or salt, in a weight ratio of tartrate monosuccinic acid or salt, to tartrate disuccinic acid or salt, of from about 97:3 to 20:80; and
   (B) the dispersing/anti-redeposition agent is selected from
      (i) water-soluble salts of polyacrylic acid; and
      (ii) combinations of said polyacrylic acid salts and ethoxylated amine polymers in a weight ratio of polyacrylic acid salt to ethoxylated amine polymer of from about 5:1 to 1:5.

5. A detergent composition comprising:
   (A) from about 5% to 50% by weight of one or more of an ether carboxylate sequestering agent having the formula:

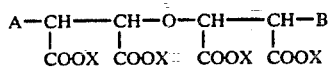

wherein
A is H or OH;
B is H or

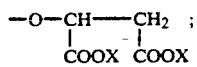

and
X is H or a salt-forming cation; and
(B) from about 0.2% to 5% by weight of a dispersing-/anti-redeposition agent selected from the group consisting of:
(i) polycarboxylates which are polymers or copolymers which contain at least about 60% by weight of segments having the general formula:

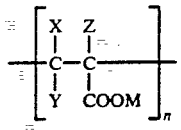

wherein X, Y and Z are, independently, selected from hydrogen, methyl, carboxy, carboxymethyl, hydroxy and hydroxymethyl; M is H or a salt-forming cation and n ranges from about 30 to about 400; and
(ii) combinations of said polycarboxylate and ethoxylated amine materials selected from the group consisting of
(a) ethoxylated monoamines having the formual:

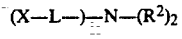

(b) ethoxylated diamines having the formula:

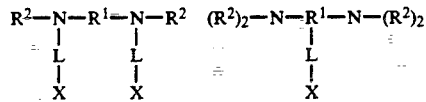

or

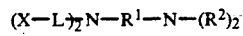

(c) ethoxylated polyamines having the formula:

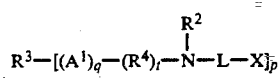

(d) ethoxylated amine polymers having the general formula:

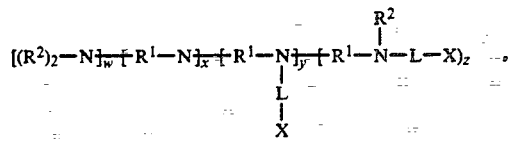

and (e) mixtures of such ethoxylated amines;
wherein $A^1$ is

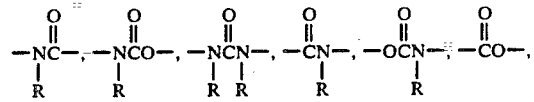

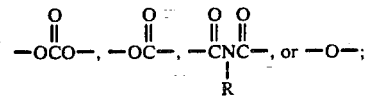

R is H or $C_1$-$C_4$ alkyl or hydroxyalkyl; $R^1$ is $C_2$-$C_{12}$ alkylene, hydroxyalkylene, alkenylene, arylene or alkarylene, or a $C_2$-$C_3$ oxyalkylene moiety having from 2 to about 20 oxyalkylene units provided that no O—N bonds are formed; each $R^2$ is $C_1$-$C_4$ alkyl or hydroxyalkyl, the moiety —L—X, or two $R^2$ together form the moiety —(CH$_2$)$_r$—$A^2$—(CH$_2$)$_s$—, wherein $A^2$ is —O— or —CH$_2$—, r is 1 or 2, s is 1 or 2, and r+s is 3 or 4; X is a nonionic group, an anionic group or mixture thereof; $R^3$ is a substituted $C_3$-$C_{12}$ alkyl, hydroxyalkyl, alkenyl, aryl, or alkaryl group having p substitution sites; $R^4$ is $C_1$-$C_{12}$ alkylene, hydroxyalkylene, alkenylene, arylene or alkarylene, or a $C_2$-$C_3$ oxyalkylene moiety have from 2 to about 20 oxyalkylene units provided that no O—O or O—N bonds are formed; L is a hydrophilic chain which contains the polyoxyalkylene moiety —[($R^5$O)$_m$(CH$_2$CH$_2$O)$_n$]—, wherein $R^5$ is $C_3$-$C_4$ alkylene or hydroxyalkylene and m and n are numbers such that the moiety —(CH$_2$CH$_2$O)$_n$— comprises at least about 50% by weight of said polyoxyalkylene moiety; for said monoamines, m is from 0 to about 4, and n is at least about 12; for said diamines, m is from 0 to about 3, and n is at least about 6 when $R^1$ is $C_2$-$C_3$ alkylene, hydroxyalkylene, or alkenylene, and at least about 3 when $R^1$ is other than $C_2$-$C_3$ alkylene, hydroxyalkylene or alkenylene; for said polyamines and amine polymers, m is from 0 to about 10 and n is at least about 3; p is from 3 to 8; q is 1 or 0; t is 1 or 0, provided that t is 1 when q is 1; w is 1 or 0; x+y+z is at least 2; and y+z is at least 2;
the weight ratio of sequestering agent to dispersing-/anti-redeposition agent within said composition being within the range of from about 99:1 to 70:31; and
(C) from about 5% to 40% by weight of a surfacant.
6. A detergent composition according to claim 5 wherein
(A) the ether carboxylate sequestering agent comprises from about 10% to 30% by weight of the composition;
(B) the dispersing/anti-redeposition agent comprises from about 0.5% to 3% by weight of the composition;
(C) the weight ratio of sequestering agent to dispersing/anti-redeposition agent in the composition ranges from about 80:20 ro 95:5; and
(D) the surfactant comprises from about 10% to 30% by weight of the composition.

7. A detergent composition according to claim 6 wherein
   (A) the ether carboxylate sequestering agent is a water-soluble salt of oxydisuccinic acid; and
   (B) the dispersing/anti-redeposition agent is selected from
      (i) water-soluble salts of polyacrylic acid; and
      (ii) combinations of said polyacrylate acid salts and ethoxylated amine polymers in a weight ratio of polyacrylic acid salt to ethoxylated amine polymer of from about 5:1 to 1:5.

8. A detergent composition according to claim 7 wherein the ethoxylated amine polymer component is selected from
   (A) an ethoxylated polyethyleneamine having a molecular weight of from about 140 to about 310 prior to ethoxylation; and
   (B) an ethoxylated polyethyleneimine having a molecular weight of from about 600 to about 1800 prior to ethoxylation.

9. A detergent composition according to claim 6 wherein
   (A) the ether carboxylate sequestering agent is selected from
      (i) tartarte monosuccinic acid, or salt thereof, of the structure;

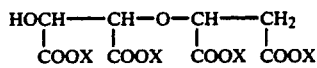

wherein X is H or a salt-forming cation;
      (ii) tartrate disuccinic acid, or salt thereof, of the structure:

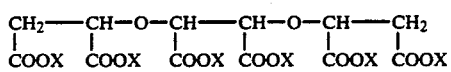

wherein X is H or a salt-forming cation, or
      (iii) a combination of said tartrate monosuccinic acid or salt and said tartrate disuccinic acid or salt, in a weight ratio of tartrate monosuccinic acid or salt, to tartrate disuccinic acid or salt, of from about 97:3 to 20:80; and
   (B) the dispersing/anti-redeposition agent is selected from
      (i) water-soluble salts of polyacrylic acid; and
      (ii) combinations of said polyacrylic acid salts and ethoxylated amine polymers in a weight ratio of polyacrylic acid salt to ethoxylated amine polymer of from about 5:1 to 1:5.

10. A detergent composition according to claim 9 wherein the ethoxylated amine polymer component is selected from
   (A) an ethoxylated polyethyleneamine having a molecular weight of from about 140 to about 310 prior to ethoxylation; and
   (B) an ethoxylated polyethyleneimine having a molecular weight of from about 600 to about 1800 prior to ethoxylation.

11. A detergent composition according to claim 6 wherein the dispersing/anti-redeposition agent comprises a combination of sodium polyacrylate having a molecular weight of from about 4,000 to 10,000 and an ethoxylated amine polymer in a weight ratio of polyacrylate to ethoxylated amine polymer which ranges from about 3:2 to 2:3.

12. A detergent composition according to claim 6 which contains from about 5% to 95% by weight of an additional component selected from the group consisting of additional detergent builders, chelating agents, enzymes, fabric whiteners and brighteners, sudsing control agents, solvents, hydrotropes, bleaching agents, bleach precursors, buffering agents, additional soil removal/anti-redeposition agents, soil release agents, fabric softening agents, perfumes, solvents, opacifiers and combinations of said additional components.

13. A laundry additive composition comprising:
   (A) from about 5% to 95% by weight of one or more of an ether carboxylate sequestering agent having the formula:

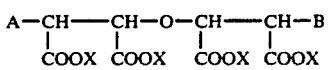

wherein
A is H or OH;
B is H or

and
X is H or a salt-forming cation; and
   (B) from about 0.2% to 10% by weight of a dispersing/anti-redeposition agent selected from the group consisting of:
      (i) polycarboxylates which are polymers or copolymers which contain at least about 60% by weight of segments having the general formula:

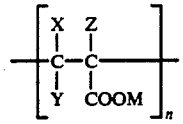

wherein X, Y and Z are, independently, selected from hydrogen, methyl, carboxy, carboxymethyl, hydroxy and hydroxymethyl; M is H or a salt-forming cation and n ranges from about 30 to about 400; and
      (ii) combinations of said polycarboxylate and ethoxylated amine materials selected from the group consisting of
         (a) ethoxylated monoamines having the formula:

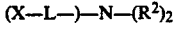

(b) ethoxylated diamines having the formula:

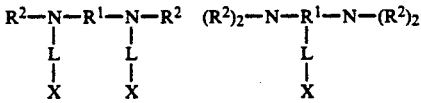

or

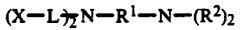

(c) ethoxylated polyamines having the formula:

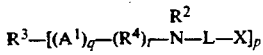

(d) ethoxylated amine polymers having the general formula:

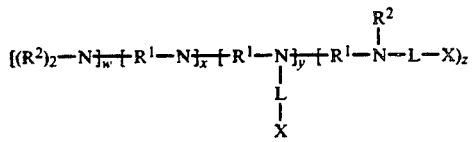

and
(e) mixtures of such ethoxylated amines; wherein $A^1$ is

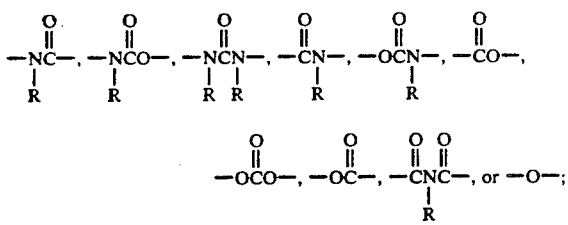

R is H or $C_1$-$C_4$ alkyl or hydroxyalkyl; $R^1$ is $C_2$-$C_{12}$ alkylene, hydroxyalkylene, alkenylene, arylene or alkarylene, or a $C_2$-$C_3$ oxyalkylene moiety having from 2 to about 20 oxyalkylene units provided that no O—N bonds are formed; each $R^2$ is $C_1$-$C_4$ alkyl or hydroxyalkyl, the moiety —L—X, or two $R^2$ together form the moiety —$(CH_2)_r$—$A^2$—$(CH_2)_s$—, wherein $A^2$ is —O— or —$CH_2$—, r is 1 or 2, s is 1 or 2, and r+s is 3 or 4; X is a nonionic group, an anionic group or mixture thereof; $R^3$ is a substituted $C_3$-$C_{12}$ alkyl, hydroxyalkyl, alkenyl, aryl, or alkaryl group having p substitution sites; $R^4$ is $C_1$-$C_{12}$ alkylene, hydroxylalkylene, alkenylene, arylene or alkraylene, or a $C_2$-$C_3$ oxyalkylene moiety have from 2 to about 20 oxyalkylene units provided that no O—O or O—N bonds are formed; L is a hydrophilic chain which contains the polyoxyalkylene moiety —[$(R^5O)_m(CH_2CH_2O)_n$]—, wherein $R^5$ is $C_3$-$C_4$ alkylene or hydroxyalkylene and m and n are numbers such that the moiety —$(CH_2CH_2O)_n$— comprises at least about 50% by weight of said polyoxyalkylene moiety; for said monoamines, m is from 0 to about 4, and n is at least about 12; for said diamines, m is from 0 to about 3, and n is at least about 6 when $R^1$ is $C_2$-$C_3$ alkylene, hydroxyalkylene, or alkenylene, and at least about 3 when $R^1$ is other than $C_2$-$C_3$ alkylene, hydroxyalkylene or alkenylene; for said polyamines and amine polymers, m is from 0 to about 10 and n is at least about 3; p is from 3 to 8; q is 1 or 0; t is 1 or 0, provided that t is 1 when q is 1; w is 1 or 0; x+y+z is at least 2; and y+z is at least 2;

the weight ratio of sequestering agent to dispersing/anti-redeposition agent within said composition being within the range of from about 99:1 to 70:30; and (C) from about 0.5% to 98% by weight of a laundry adjuvant selected from the group consisting of surfactants, additional detergent builders, chelating agents, enzymes, fabric whiteners and brighteners, sudsing control agents, solvents, hydrotropes, bleaching agents, bleach precursors, buffering agents, additional soil removal/anti-redeposition agents, soil release agents, fabric softening agents, perfumes, colorants, opacifiers and combinations of said laundry adjuvants.

14. A laundry additive composition according to claim 13 wherein
(A) the ether carboxylate sequestering agent is selected from the group consisting of sodium oxydisuccinate, sodium tartrate monosuccinate, sodium tartrate disuccinate, and combinations thereof; and
(B) the laundry adjuvant is selected from surfactants, bleaching agents, bleach percursors, enzymes and combinations of said laundry adjuvants.

15. A detergent composition comprising
(A) from about 5% to 40% by weight of a surfactant;
(B) from about 5% to 50% by weight of an ether carboxylate sequestering agent selected from
(i) sodium oxydisuccinate; and
(ii) a combination of sodium tartrate monosuccinate and sodium tartrate disuccinate in a weight ratio of the monosuccinate to the disuccinate of from about 97:3 to 20:80; and
(C) from about 0.2% to 5% by weight of a dispersing-/anit-redeposition agent selected from
(i) sodium polyacrylate having a molecular weight of from about 4,000 to 10,000; and
(ii) combinations of said polycarboxylate and ethoxylated polyethyleneamines having a molecular weight of from about 100 to 400 prior to ethoxylation and a degree of ethoxylation of at least about 3 in a weight ratio of from about 5:1 to 1:5;
the weight ratio of sequestering agent to dispersing/anti-redeposition agent in said composition ranging from about 99:1 to 70:30.

16. A detergent composition according to claim 15 wherein the dispersing/anti-redeposition agent is a combination of sodium polyacrylate and an ethoxylated polyethyleneamine having a molecular weight of from about 140 to 200 prior to ethoxylation and a degree of ethoxylation of from about 12 to 42.

17. A detergent composition according to claim 16 which additionally contains from about 0.1% to 10% by weight of a chelating agent selected from amino carboxylates, amino phosphonates, poly-functionally substituted aromatic chelating agents and combinations of these materials.

18. A detergent composition according to claim 17 wherein the sequestering agent is sodium oxydisuccinate.

19. A detergent composition according to claim 17 wherein the chelating agent is a diethylenetriaminepentaacetate.

* * * * *

UNITED STATES PATENT AND TRADEMARK OFFICE
CERTIFICATE OF CORRECTION

PATENT NO. : 4,689,167

DATED : August 25, 1987

INVENTOR(S) : Jerome Howard Collins, Larry Neil Mackey, Gianfranco Luigi Spadini It is certified that error appears in the above-identified patent and that said Letters Patent is hereby corrected as shown below:

Column 30, line 32, "polymerof" should be --polymer of--.

Column 31, line 38, "formual:" should be --formula:--.

Column 32, line 54, "70:31;" should be --70:30;--.

Column 35, line 45, "alkraylene," should be alkarylene--.

Signed and Sealed this

Twenty-first Day of February, 1989

Attest:

DONALD J. QUIGG

Attesting Officer

Commissioner of Patents and Trademarks